US010051905B2

(12) United States Patent
Benefiel et al.

(10) Patent No.: US 10,051,905 B2
(45) Date of Patent: Aug. 21, 2018

(54) LASER FINISHING OF APPAREL

(71) Applicant: Levi Strauss & Co., San Francisco, CA (US)

(72) Inventors: Jennifer Benefiel, San Francisco, CA (US); James Barton Sights, San Francisco, CA (US); Christopher Schultz, San Francisco, CA (US)

(73) Assignee: Levi Strauss & Co., San Francisco, CA (US)

( * ) Notice: Subject to any disclaimer, the term of this patent is extended or adjusted under 35 U.S.C. 154(b) by 0 days.

(21) Appl. No.: 15/682,507

(22) Filed: Aug. 21, 2017

(65) Prior Publication Data
US 2018/0049496 A1 Feb. 22, 2018

Related U.S. Application Data

(60) Provisional application No. 62/433,739, filed on Dec. 13, 2016, provisional application No. 62/377,447, filed on Aug. 19, 2016.

(51) Int. Cl.
| G06F 19/00 | (2018.01) |
| A41H 3/00 | (2006.01) |
| A41H 3/08 | (2006.01) |
| B44C 1/22 | (2006.01) |
| B41M 5/24 | (2006.01) |
| D06C 23/00 | (2006.01) |
| G06F 17/50 | (2006.01) |

(52) U.S. Cl.
CPC ............. *A41H 3/007* (2013.01); *A41H 3/08* (2013.01); *B41M 5/24* (2013.01); *B44C 1/228* (2013.01); *D06C 23/00* (2013.01); *G06F 17/50* (2013.01); *D06C 2700/31* (2013.01); *G06F 2217/32* (2013.01)

(58) Field of Classification Search
CPC .......... A41H 3/007; A41H 3/08; B44C 1/228; D06C 23/00; D06C 2700/31
USPC ................................................. 700/130–133
See application file for complete search history.

(56) References Cited

U.S. PATENT DOCUMENTS

| 3,883,298 A | 5/1975 | Platt |
| 3,983,132 A | 9/1976 | Strobel |
| 4,527,383 A | 7/1985 | Bingham |
| (Continued) | | |

FOREIGN PATENT DOCUMENTS

| CA | 2066978 A1 | 6/1993 |
| CN | 101187640 A | 5/2008 |
| (Continued) | | |

OTHER PUBLICATIONS

International Search Report, PCT Application PCT/US2017/047864, dated Nov. 29, 2017, 3 pages.

*Primary Examiner* — Nathan Durham
(74) *Attorney, Agent, or Firm* — Aka Chan LLP

(57) ABSTRACT

Software and lasers are used in finishing apparel to produce a desired wear pattern or other design. A technique includes determining a fabric's response to a laser, capturing an initial image of a wear pattern on a garment, and processing the initial image to obtain a working image in grayscale. The working image is further processed to obtain a difference image by comparing each pixel relative to a dark reference. The difference image is converted to a laser values image by using the previously determined fabric response to the laser.

244 Claims, 19 Drawing Sheets

(56) References Cited

U.S. PATENT DOCUMENTS

| | | |
|---|---|---|
| 5,015,849 A | 5/1991 | Gilpatrick |
| 5,185,511 A | 2/1993 | Yabu |
| 5,201,027 A | 4/1993 | Casini |
| 5,367,141 A | 11/1994 | Piltch |
| 5,537,939 A | 7/1996 | Horton |
| 5,567,207 A * | 10/1996 | Lockman ............ D06B 11/0096 |
| | | 8/115.52 |
| 5,573,851 A | 11/1996 | Lengers et al. |
| 5,605,641 A | 2/1997 | Chiba et al. |
| 5,839,380 A | 11/1998 | Muto |
| 5,880,430 A | 3/1999 | Wein |
| 5,916,461 A * | 6/1999 | Costin ..................... B23K 26/08 |
| | | 219/121.68 |
| 5,990,444 A * | 11/1999 | Costin ..................... B23K 26/03 |
| | | 219/121.61 |
| 6,002,099 A * | 12/1999 | Martin ................... B23K 26/08 |
| | | 219/121.68 |
| 6,004,018 A | 12/1999 | Kawasato et al. |
| 6,086,966 A | 7/2000 | Gundjian et al. |
| 6,140,602 A | 10/2000 | Costin |
| 6,192,292 B1 | 2/2001 | Taguchi |
| 6,252,196 B1 * | 6/2001 | Costin ..................... B23K 26/03 |
| | | 219/121.61 |
| 6,315,202 B2 | 11/2001 | Costin et al. |
| 6,356,648 B1 | 3/2002 | Taguchi |
| 6,407,361 B1 | 6/2002 | Williams |
| 6,465,046 B1 | 10/2002 | Hansson et al. |
| 6,495,237 B1 * | 12/2002 | Costin ..................... B32B 15/08 |
| | | 219/121.6 |
| 6,548,428 B1 | 4/2003 | Lanitz et al. |
| 6,576,862 B1 | 6/2003 | Costin et al. |
| 6,616,710 B1 * | 9/2003 | Costin ............... D06B 11/0096 |
| | | 8/114.6 |
| 6,664,505 B2 | 12/2003 | Martin |
| 6,685,868 B2 | 2/2004 | Costin |
| 6,689,517 B1 | 2/2004 | Kaminsky et al. |
| 6,706,785 B1 | 3/2004 | Fu |
| 6,726,317 B2 | 4/2004 | Codos |
| 6,753,501 B1 | 6/2004 | Costin, Sr. et al. |
| 6,765,608 B1 | 7/2004 | Himeda et al. |
| 6,807,456 B1 * | 10/2004 | Costin, Jr. ............. D06C 23/00 |
| | | 219/121.61 |
| 6,819,972 B1 * | 11/2004 | Martin ............... D06B 11/0096 |
| | | 219/121.68 |
| 6,832,125 B2 | 12/2004 | Sonnenberg et al. |
| 6,836,694 B1 | 12/2004 | Podubrin |
| 6,836,695 B1 | 12/2004 | Goldman |
| 6,858,815 B1 | 2/2005 | Costin |
| 6,956,596 B2 | 10/2005 | Kataoka et al. |
| 6,962,609 B2 | 11/2005 | Rogers et al. |
| 6,974,366 B1 | 12/2005 | Johnson |
| 7,005,603 B2 | 2/2006 | Addington et al. |
| 7,054,043 B2 | 5/2006 | Mengel et al. |
| 7,057,756 B2 | 6/2006 | Ogasahara et al. |
| 7,072,733 B2 | 7/2006 | Magee et al. |
| 7,100,341 B2 | 9/2006 | McIlvaine |
| 7,240,408 B2 | 7/2007 | Latos et al. |
| 7,260,445 B2 | 8/2007 | Weiser et al. |
| 7,324,867 B2 | 1/2008 | Dinauer et al. |
| 7,699,896 B1 | 4/2010 | Colwell |
| 7,708,483 B2 | 5/2010 | Samii et al. |
| 7,728,931 B2 | 6/2010 | Hoffmuller |
| 7,863,584 B2 | 1/2011 | Tardif et al. |
| 7,937,173 B2 | 5/2011 | Weill et al. |
| 8,048,608 B2 | 11/2011 | Jarvis et al. |
| 8,278,244 B2 | 10/2012 | Stubbs et al. |
| 8,360,323 B2 | 1/2013 | Widzinski, Jr. et al. |
| 8,405,885 B2 | 3/2013 | Shah et al. |
| 8,460,566 B2 | 6/2013 | Costin, Jr. |
| 8,529,775 B2 | 9/2013 | Costin et al. |
| 8,556,319 B2 | 10/2013 | Petouhoff et al. |
| 8,581,142 B2 | 11/2013 | Colico et al. |
| 8,585,956 B1 | 11/2013 | Pagryzinski et al. |
| 8,734,679 B2 | 5/2014 | Marguerettaz et al. |
| 8,794,724 B2 * | 8/2014 | Costin, Sr. ................ B41J 3/42 |
| | | 347/2 |
| 8,849,444 B2 | 9/2014 | George |
| 8,883,293 B2 | 11/2014 | Weedlun et al. |
| 8,921,732 B2 * | 12/2014 | Costin ..................... B44C 1/228 |
| | | 219/121.6 |
| 8,974,016 B2 | 3/2015 | Costin, Sr. et al. |
| 9,034,089 B2 | 5/2015 | Jarvis et al. |
| 9,050,686 B2 | 6/2015 | Costin, Sr. et al. |
| 9,126,423 B2 | 9/2015 | Costin, Sr. et al. |
| 9,213,929 B2 | 12/2015 | Tazaki et al. |
| 9,213,991 B2 | 12/2015 | Bhardwaj et al. |
| 9,333,787 B2 | 5/2016 | Cape et al. |
| 9,364,920 B2 | 6/2016 | Costin et al. |
| 2002/0137417 A1 | 9/2002 | Tebbe |
| 2002/0179580 A1 * | 12/2002 | Costin ..................... B41M 5/24 |
| | | 219/121.68 |
| 2003/0089782 A1 | 5/2003 | Reed |
| 2004/0067706 A1 | 4/2004 | Woods |
| 2005/0131571 A1 | 6/2005 | Costin |
| 2006/0014099 A1 | 1/2006 | Faler et al. |
| 2006/0090868 A1 | 5/2006 | Brownfield et al. |
| 2007/0161304 A1 | 7/2007 | Wangbunyen |
| 2007/0205541 A1 | 9/2007 | Allen et al. |
| 2008/0023169 A1 | 1/2008 | Fernandes et al. |
| 2008/0138543 A1 | 6/2008 | Hoshino et al. |
| 2008/0153374 A1 | 6/2008 | Thiriot |
| 2008/0280107 A1 | 11/2008 | Katschorek et al. |
| 2009/0112353 A1 * | 4/2009 | Kirefu ..................... A41H 43/00 |
| | | 700/131 |
| 2009/0162621 A1 | 6/2009 | Craamer et al. |
| 2009/0266804 A1 | 10/2009 | Costin et al. |
| 2010/0183822 A1 | 7/2010 | Ruggie et al. |
| 2010/0279079 A1 | 11/2010 | Campbell et al. |
| 2011/0101088 A1 | 5/2011 | Marguerettaz et al. |
| 2011/0187025 A1 | 8/2011 | Costin, Sr. |
| 2011/0261141 A1 | 10/2011 | Costin, Sr. et al. |
| 2011/0295410 A1 * | 12/2011 | Yamada ................. D05B 19/08 |
| | | 700/138 |
| 2012/0061470 A1 | 3/2012 | Marguerettaz et al. |
| 2012/0182375 A1 | 7/2012 | Shourvarzi et al. |
| 2012/0197429 A1 * | 8/2012 | Nykyforov ........... G06T 7/0004 |
| | | 700/138 |
| 2014/0342903 A1 | 11/2014 | Jarvis et al. |
| 2015/0030821 A1 | 1/2015 | Costin, Sr. et al. |
| 2015/0079359 A1 | 3/2015 | Costin, Jr. |
| 2015/0106993 A1 | 4/2015 | Hoffman et al. |
| 2015/0119238 A1 | 4/2015 | Pretsch et al. |
| 2015/0121965 A1 | 5/2015 | Costin et al. |
| 2015/0153278 A1 | 6/2015 | Erkelenz et al. |
| 2015/0183231 A1 | 7/2015 | Costin, Sr. et al. |
| 2015/0298253 A1 | 10/2015 | Costin, Jr. et al. |
| 2015/0343568 A1 | 12/2015 | Constin, Jr. et al. |
| 2015/0361597 A1 * | 12/2015 | Candrian .................. D03D 1/00 |
| | | 28/153 |
| 2016/0016879 A1 | 1/2016 | Bertin et al. |
| 2016/0060807 A1 * | 3/2016 | Tharpe .................... B23K 26/70 |
| | | 264/400 |
| 2016/0251782 A1 * | 9/2016 | Liao ......................... D04B 1/18 |
| | | 66/202 |
| 2016/0263928 A1 * | 9/2016 | Costin, Jr. .......... D06B 11/0096 |
| 2016/0361937 A1 | 12/2016 | Costin, Sr. et al. |
| 2016/0362820 A1 * | 12/2016 | Livecchi ................. D03D 1/00 |

FOREIGN PATENT DOCUMENTS

| | | |
|---|---|---|
| CN | 102371830 A | 3/2012 |
| CN | 102704215 A | 10/2012 |
| CN | 104687695 A | 6/2015 |
| CN | 204398442 U | 6/2015 |
| CN | 204653890 U | 9/2015 |
| CN | 104983103 A | 10/2015 |
| DE | 1965103 A1 | 7/1971 |
| DE | 3916126 A1 | 11/1990 |
| EP | 0328320 A1 | 8/1989 |
| EP | 1279460 A1 | 1/2003 |
| EP | 1459836 A2 | 9/2004 |
| ES | 2147473 A1 | 9/2000 |

(56) References Cited

FOREIGN PATENT DOCUMENTS

| | | |
|---|---:|---:|
| GB | 1259530 A | 1/1972 |
| GB | 1294116 A | 10/1972 |
| GB | 2199462 A | 7/1988 |
| GB | 2294656 A | 5/1996 |
| GB | 2448763 A | 10/2008 |
| JP | 11291368 A | 10/1999 |
| TW | M1276842 U | 5/1994 |
| WO | 8202689 A1 | 8/1982 |
| WO | WO/2001/025824 | 4/2001 |
| WO | 0214077 A1 | 2/2002 |
| WO | 2004045857 A2 | 6/2004 |
| WO | 2008072853 A1 | 6/2008 |
| WO | 2010017648 A1 | 2/2010 |
| WO | 2011143471 A1 | 11/2011 |
| WO | 2012016316 A1 | 2/2012 |
| WO | 2013137836 A1 | 9/2013 |
| WO | WO/2015/042441 | 3/2015 |
| WO | 2016065134 A1 | 4/2016 |

\* cited by examiner

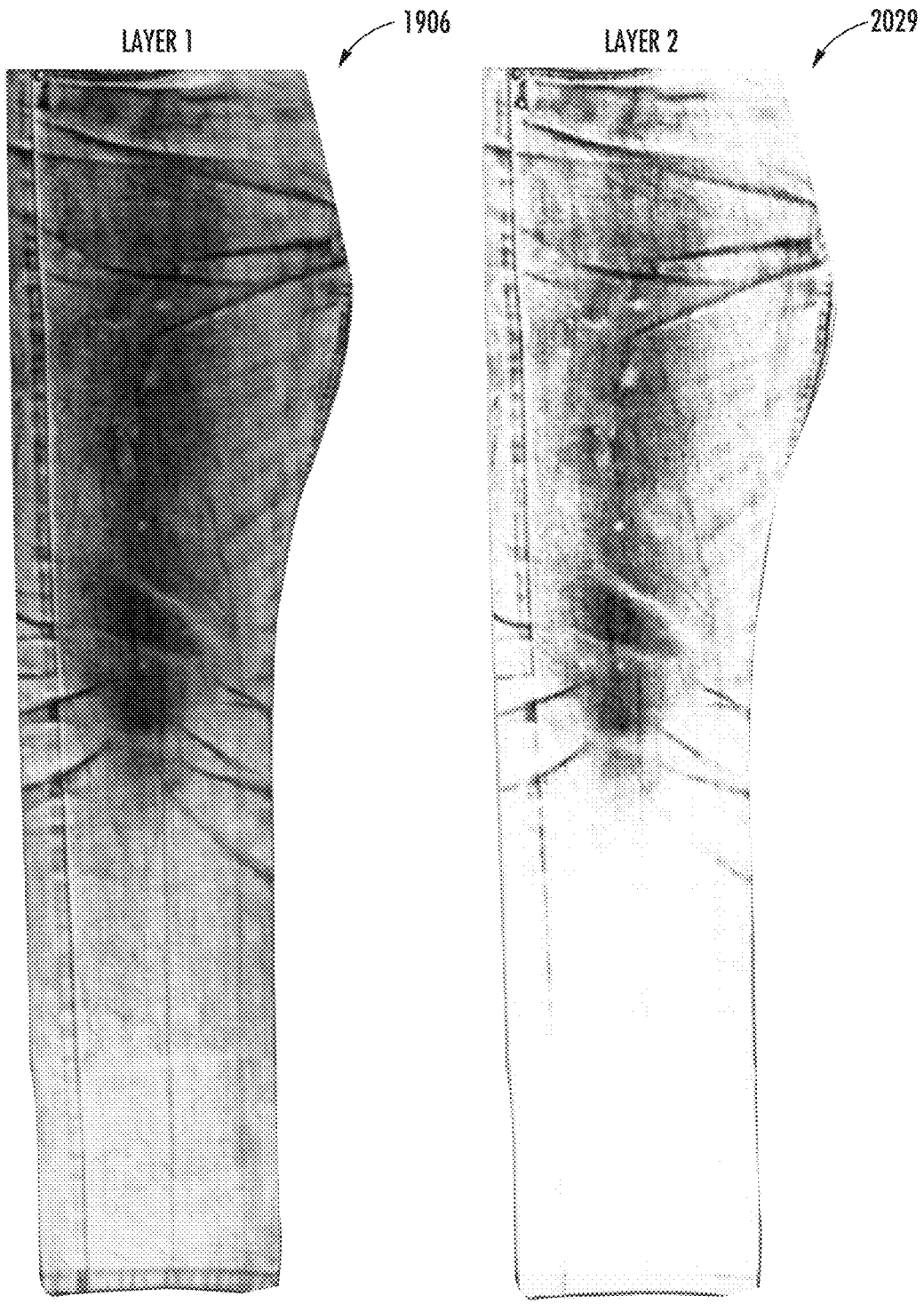

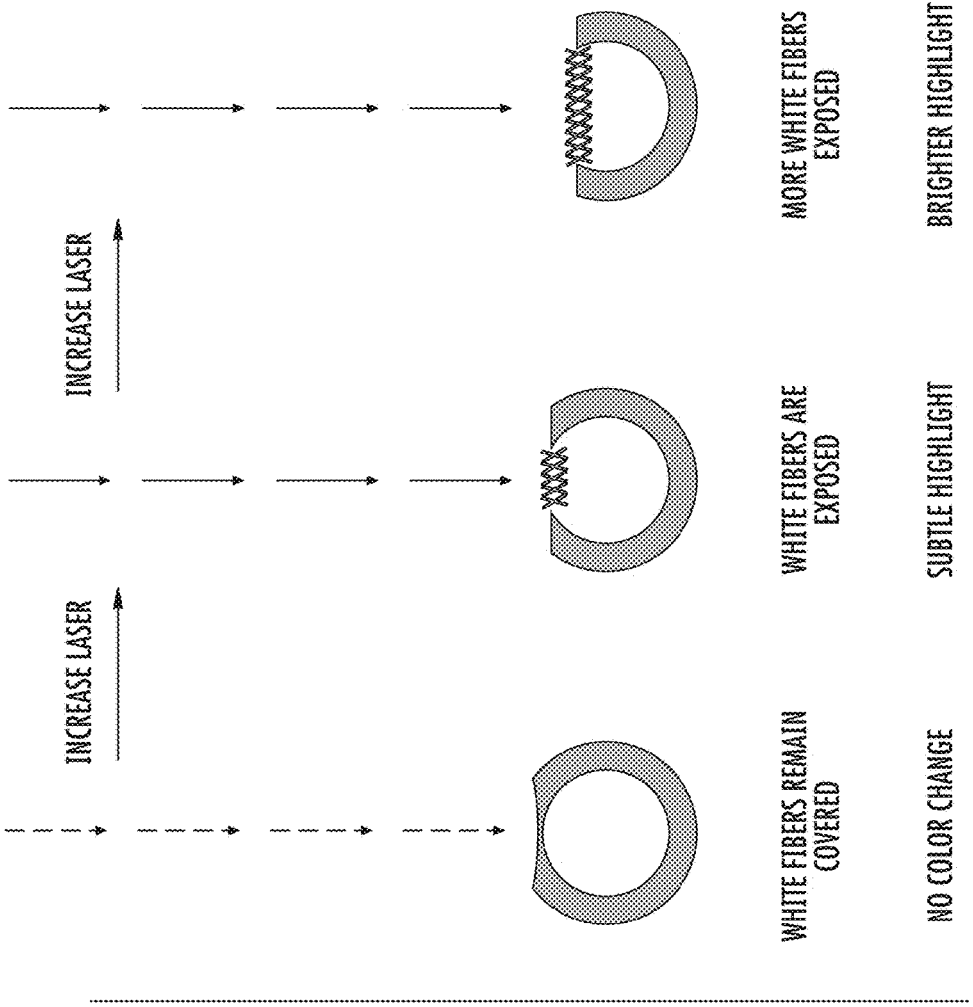
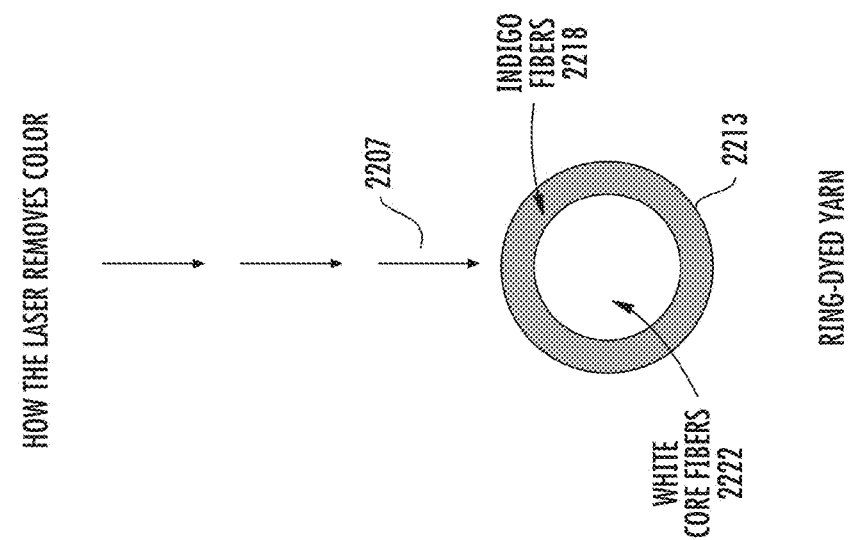

10,051,905 B2

LASER FINISHING OF APPAREL

CROSS-REFERENCE TO RELATED APPLICATIONS

This patent application claims the benefit of U.S. patent applications 62/433,739, filed Dec. 13, 2016, and 62/377,447, filed Aug. 19, 2016. These applications are incorporated by reference along with all other references cited in this application.

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

The present invention relates to apparel finishing and, more specifically, the use of a laser in the finishing of garments, especially denim including jeans, shirts, shorts, jackets, vests, and skirts, to obtain a faded, distressed, washed, or worn finish or appearance.

In 1853, during the California Gold Rush, Levi Strauss, a 24-year-old German immigrant, left New York for San Francisco with a small supply of dry goods with the intention of opening a branch of his brother's New York dry goods business. Shortly after arriving in San Francisco, Mr. Strauss realized that the miners and prospectors (called the "forty niners") needed pants strong enough to last through the hard work conditions they endured. So, Mr. Strauss developed the now familiar jeans which he sold to the miners. The company he founded, Levi Strauss & Co., still sells jeans and is the most widely known jeans brand in the world. Levi's is a trademark of Levi Strauss & Co. or LS&Co.

Though jeans at the time of the Gold Rush were used as work clothes, jeans have evolved to be fashionably worn everyday by men and women, showing up on billboards, television commercials, and fashion runways. Fashion is one of the largest consumer industries in the U.S. and around the world. Jeans and related apparel are a significant segment of the industry.

As fashion, people are concerned with the appearance of their jeans. Many people desire a faded or worn blue jeans look. In the past, jeans became faded or distressed through normal wash and wear. The apparel industry recognized people's desire for the worn blue jeans look and began producing jeans and apparel with a variety of wear patterns. The wear patterns have become part of the jeans style and fashion. Some examples of wear patterns include combs or honeycombs, whiskers, stacks, and train tracks.

Despite the widespread success jeans have enjoyed, the process to produce modern jeans with wear patterns takes processing time, has relatively high processing cost, and is resource intensive. A typical process to produce jeans uses significant amounts of water, chemicals (e.g., bleaching or oxidizing agents), ozone, enzymes, and pumice stone. For example, it may take about 20 to 60 liters of water to finish each pair of jeans.

Therefore, there is a need for an improved process for finishing jeans that reduces environmental impact, processing time, and processing costs, while maintaining the look and style of traditional finishing techniques.

BRIEF SUMMARY OF THE INVENTION

Software and lasers are used in finishing apparel to produce a desired wear pattern or other design. A technique includes determining a fabric's response to a laser, capturing an initial image of a wear pattern on a garment, and processing the initial image to obtain a working image in grayscale. The working image is further processed to obtain a difference image by comparing each pixel relative to a dark reference. The difference image is converted to a laser values image by using the previously determined fabric response to the laser.

Wear patterns and other designs on garments (including jeans and other denim garments) are reproduced by capturing digital images (e.g., high resolution digital photographs, potentially in a raw format) of existing garments exhibiting desirable wear patterns or other designs, processing the digital images using software, and then using the processed images as the patterns to control a laser to reproduce the desired pattern or design on a new garment. This process permits the reproduction of desirable, complex, and authentic wear patterns taken from worn garments such as jeans on new articles of clothing before sale.

In an implementation, a method includes forming a first pattern on a surface of a target fabric material. The first pattern includes a number of color shades where the color shades are lighter shades relative to an original color of the target fabric material. The first pattern is formed by exposing the target fabric material to a laser beam at a variety of laser levels.

The method includes: from the first pattern created by a laser, obtaining a fabric response characteristic for the target fabric material in response to the laser; providing a first garment having a preexisting finishing pattern; and from the first garment having a preexisting finishing pattern, obtaining a first image representative of the preexisting finishing pattern.

The method includes: from the first image, obtaining a second image representative of the preexisting finishing pattern, where the second image includes a reverse image, compared to the first image; using the second image and the fabric response characteristic, creating a laser values input file; and forming on a second pattern on a surface of a second garment, where the second garment is made of the target fabric material. The second pattern is formed by exposing the second garment to a laser beam controlled by the laser values input file.

In an implementation, a system includes an assembled garment made of a fabric material, where the assembled garment will be exposed to a laser beam that will create a finishing pattern on a surface of the assembled garment. There is a laser that emits the laser beam, where the laser beam will form a finishing pattern on the surface of the fabric material of the assembled garment based on the laser input file. The laser input file is obtained by providing a fabric response characteristic function for the fabric material in response to the laser, providing a preexisting finishing pattern captured from a garment having a finishing pattern, and converting the preexisting finishing pattern based on the fabric response characteristic function into the laser input file. The laser input file can be a reverse image.

In an implementation, a method includes assembling a jeans made from fabric panels of a woven first denim material including a warp having indigo ring-dyed cotton yarn, where the fabric panels are sewn together using thread. A laser input file is created that is representative of a finishing pattern from an existing jeans made from a second denim material. The first denim material has a different fabric characteristic from the second denim material.

The creating the laser input file can include: capturing a target image of the finishing pattern from the existing jeans of the second denim material, and determining values for the laser input file that will result in a finishing pattern on the first denim material to obtain an appearance similar to the target image of the finishing pattern from the existing jeans of the second denim material.

A laser is used to create a finishing pattern on an outer surface of the jeans based on a laser input file. Based on the laser input file, the laser removes selected amounts of material from the surface of the first material at different pixel locations of the jeans. For lighter pixel locations of the finishing pattern, a greater amount of the indigo ring-dyed cotton warp yarn is removed, while for darker pixel locations of the finishing pattern, a lesser amount of the indigo ring-dyed cotton warp yarn is removed. The finishing pattern created can extend across portions of the jeans where two or more fabric panels are joined together by the threads by exposing these portions to the laser.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIGS. 19-20 show multiple image layers that can be used by a laser in a multiple-pass finishing technique.

FIGS. 22-25 show how the laser alters the color of ring-dyed yarn.

DETAILED DESCRIPTION OF THE INVENTION

Figure 1:
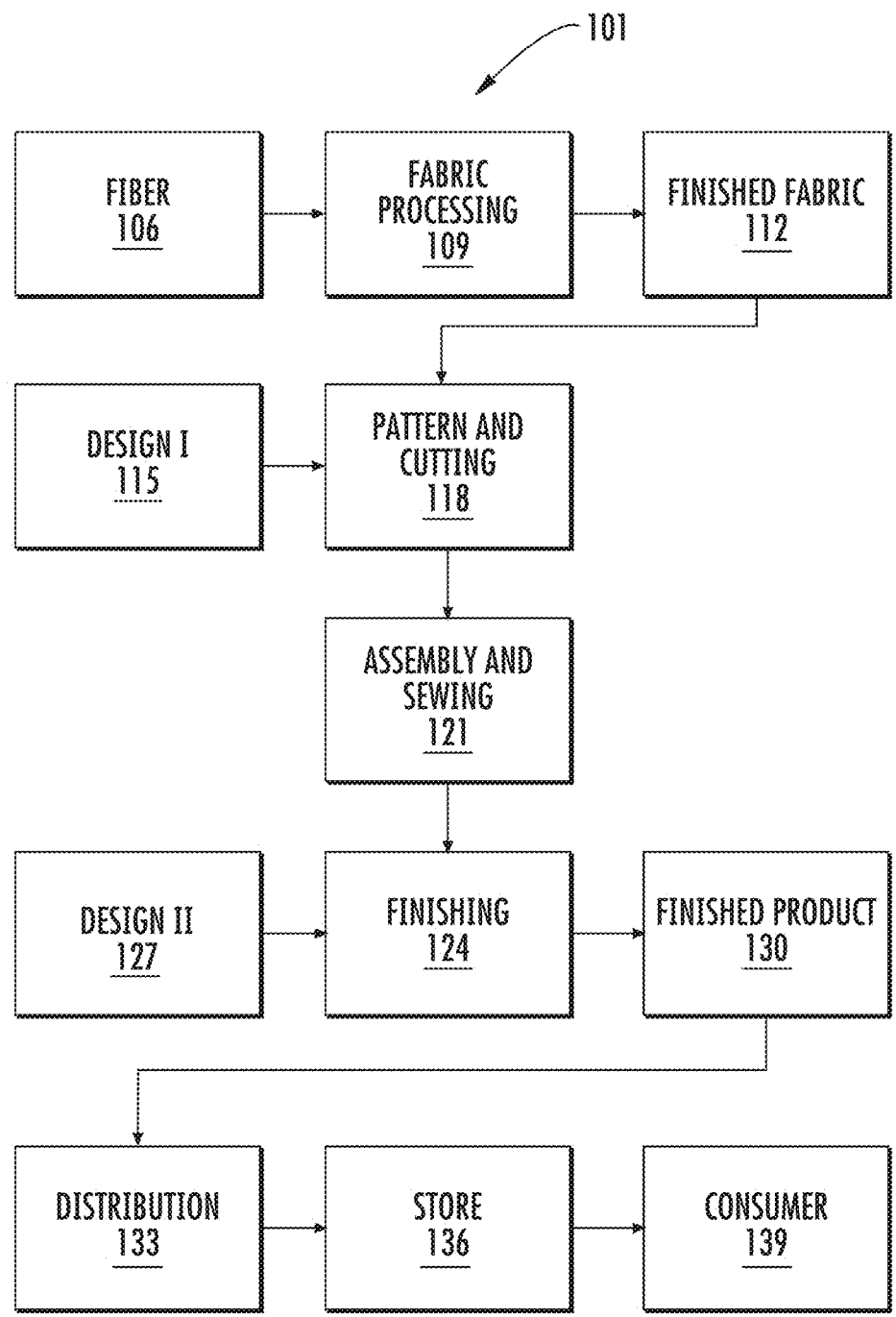
FIG. 1 shows a process flow for manufacturing apparel.

FIG. 1 shows a process flow 101 for manufacturing apparel such as jeans. The fabric or material for various apparel including jeans is made from natural or synthetic fibers 106, or a combination of these. A fabric mill takes fibers and processes 109 these fibers to produce a finished fabric 112. Some examples of natural fibers include cotton, flax, hemp, sisal, jute, kenaf, and coconut; fibers from animal sources include silk, wool, cashmere, and mohair. Some examples of synthetic fibers include polyester, nylon, spandex or elastane, and other polymers. Some examples of semisynthetic fibers include rayon, viscose, modal, and lyocell, which are made from a regenerated cellulose fiber. A fabric can be a natural fiber alone (e.g., cotton), a synthetic fiber alone (e.g., polyester alone), a blend of natural and synthetic fibers (e.g., cotton and polyester blend, or cotton and spandax), or a blend of natural and semisynthetic fibers, or any combination of these or other fibers.

For jeans, the fabric is typically a denim, which is a sturdy cotton warp-faced textile in which a weft passes under two or more warp threads. This twill weaving produces a diagonal ribbing. The yarn or fabric is dyed using an indigo or blue dye, which is characteristic of blue jeans.

Although this patent describes the apparel processing and finishing with respect to jeans, the invention is not limited jeans or denim products, such as shirts, shorts, jackets, vests, and skirts. The techniques and approaches described are applicable to other apparel and products, including non-denim products and products made from knit materials. Some examples include T-shirts, sweaters, coats, sweatshirts (e.g., hoodies), casual wear, athletic wear, outerwear, dresses, sleepwear, loungewear, underwear, socks, bags, backpacks, uniforms, umbrellas, swimwear, bed sheets, scarves, and many others.

A manufacturer creates a design 115 (design I) of its product. The design can be for a particular type of clothing or garment (e.g., men's or women's jean, or jacket), sizing of the garment (e.g., small, medium, or large, or waist size and inseam length), or other design feature. The design can be specified by a pattern or cut used to form pieces of the pattern. A fabric is selected and patterned and cut 118 based on the design. The pattern pieces are assembled together 121 into the garment, typically by sewing using thread (e.g., polyester or cotton thread), but can be joined together using other techniques (e.g., rivets, buttons, zipper, hoop and loop, adhesives, or other techniques and structures to join fabrics and materials together).

Some garments can be complete after assembly and ready for sale. However, other garments may have additional finishing 124. The finishing may include tinting, washing, softening, and fixing. For distressed denim products, the finishing can include producing a wear pattern according to a design 127 (design II). Design 127 is for postassembly aspects of a garment while design 115 is for preassembly aspects of a garment. After finishing, a finished product 130 is complete and ready for sale. The finished product is inventoried and distributed 133, delivered to stores 136, and sold to consumers or customers 139. The consumer can buy and wear worn blue jeans without having to wear out the jeans themselves, which usually takes significant time and effort.

To produce distressed denim products, finishing can include dry abrasion, wet processing, oxidation, or other techniques, or combinations of these, to accelerate wear of the material in order to produce a desired wear pattern. Dry abrasion can include sandblasting or using sandpaper. For example, some portions or localized areas of the fabric are sanded to abrade the fabric surface. Wet processing can include washing in water, washing with oxidizers (e.g., bleach, peroxide, ozone, or potassium permanganate), spraying with oxidizers, washing with abrasives (e.g., pumice, stone, or grit).

These traditional finishing approaches take time, incur expense, and impact the environment by utilizing resources and producing waste. It is desirable to reduce water and chemical usage, which can include eliminating the use agents such as potassium permanganate and pumice. An alternative to these traditional finishing approaches is laser finishing.

Figure 2:
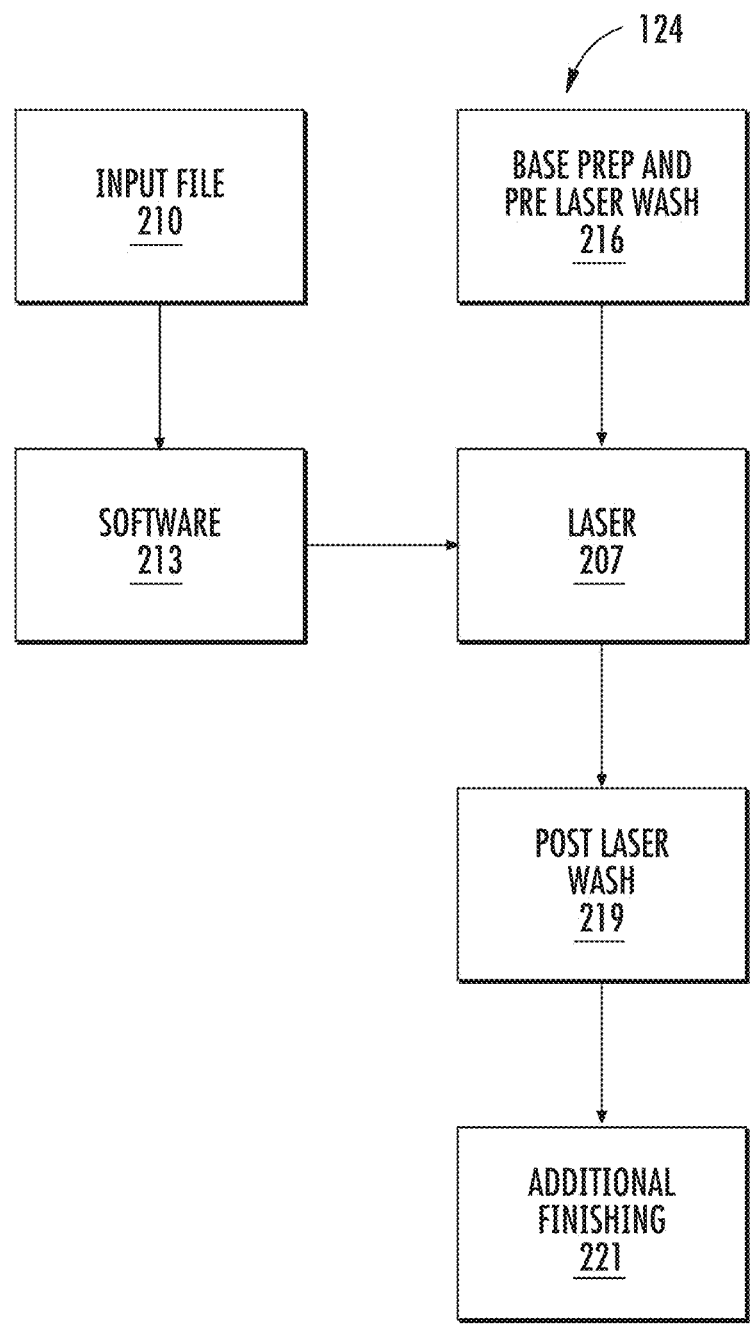
FIG. 2 shows a flow for a finishing technique that includes the use of a laser.

FIG. 2 shows a finishing technique that includes the use of a laser 207. A laser is a device that emits light through a process of optical amplification based on the stimulated emission of electromagnetic radiation. Lasers are used for bar code scanning, medical procedures such as corrective eye surgery, and industrial applications such as welding. A particular type of laser for finishing apparel is a carbon dioxide laser, which emits a beam of infrared radiation.

The laser is controlled by an input file 210 and control software 213 to emit a laser beam onto fabric at a particular position or location at a specific power level for a specific amount of time. Further, the power of the laser beam can be varied according to a waveform such as a pulse wave with a particular frequency, period, pulse width, or other characteristic. Some aspects of the laser that can be controlled include the duty cycle, frequency, marking or burning speed, and other parameters.

The duty cycle is a percentage of laser emission time. Some examples of duty cycle percentages include 40, 45, 50, 55, 60, 80, and 100 percent. The frequency is the laser pulse frequency. A low frequency might be, for example, 5 kilohertz, while a high frequency might be, for example, 25 kilohertz. Generally, lower frequencies will have higher surface penetration than high frequencies, which has less surface penetration.

The laser acts like a printer and "prints," "marks," or "burns" a wear pattern (specified by input file 210) onto the garment. The fabric that is exposed to the laser beam (e.g., infrared beam) changes color, lightening the fabric at a specified position by a certain amount based on the laser power, time of exposure, and waveform used. The laser continues from position to position until the wear pattern is completely printed on the garment.

In a specific implementation, the laser has a resolution of about 34 dots per inch (dpi), which on the garment is about 0.7 millimeters per pixel. The technique described in this patent is not dependent on the laser's resolution, and will work with lasers have more or less resolution than 34 dots per inch. For example, the laser can have a resolution of 10, 15, 20, 25, 30, 40, 50, 60, 72, 80, 96, 100, 120, 150, 200, 300, or 600 dots per inch, or more or less than any of these or other values. Typically, the greater the resolution, the finer the features that can be printed on the garment in a single pass. By using multiple passes (e.g., 2, 3, 4, 5, or more passes) with the laser, the effective resolution can be increased. In an implementation, multiple laser passes are used.

Jeans are dyed using an indigo dye, which results in a blue colored fabric. The blue color is caused by chromophores trapped in the fabric which reflect light as a blue color. The laser beam removes these chromophores. Depending on the amount of chromophores removed, the shade of blue of the fabric will vary, from deep blue to almost white or white.

U.S. patent application 62/433,739, which is incorporated by reference, describes a denim material with enhanced response characteristics to laser finishing. Using a denim material made from indigo ring-dyed yarn, variations in highs and lows in indigo color shading is achieved by using a laser.

Figure 21:
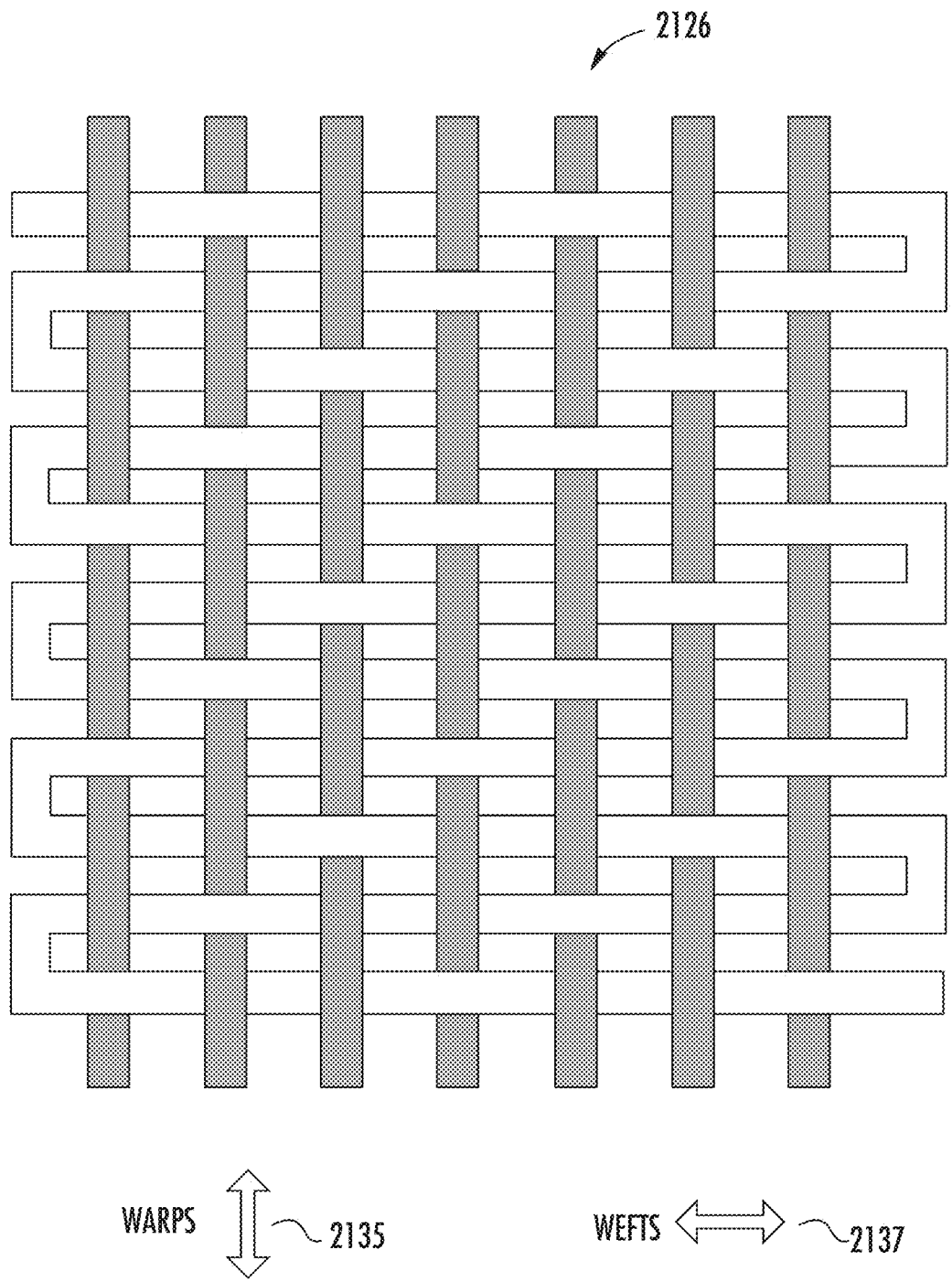
FIG. 21 shows a weave pattern for a denim fabric.

FIG. 21 shows a weave pattern of a denim fabric 2126. A loom does the weaving. In weaving, warp is the lengthwise or longitudinal yarn or thread in a roll, while weft or woof is the transverse thread. The weft yarn is drawn through the warp yarns to create the fabric. In FIG. 21, the warps extend in a first direction 2135 (e.g., north an south) while the wefts extend in a direction 2137 (e.g., east and west). The wefts are shown as a continuous yarn that zigzags across the wefts (e.g., carried across by a shuttle or a rapier of the loom). Alternatively, the wefts could be separate yarns. In some specific implementations, the warp yarn has a different weight or thickness than the weft yarns. For example, warp yarns can be coarser than the weft yarns.

For denim, dyed yarn is used for the warp, and undyed or white yarn is typically used for the weft yarn. In some denim fabrics, the weft yarn can be dyed and have a color other than white, such as red. In the denim weave, the weft passes under two or more warp threads. FIG. 21 shows a weave with the weft passing under two warp threads. Specifically, the fabric weave is known as a 2×1 right-hand twill. For a right-hand twill, a direction of the diagonal is from a lower left to an upper right. For a left-hand twill, a direction of the diagonal is from an lower right to an upper left. But in other denim weaves, the weft can pass under a different number of warp threads, such as 3, 4, 5, 6, 7, 8, or more. In other implementation, the denim is a 3×1 right-hand twill, which means the weft passes under three warp threads.

Because of the weave, one side of the fabric exposes more of the warp yarns (e.g., warp-faced side), while the other side exposes more of the weft yarns (e.g., weft-faced side). When the warp yarns are blue and weft yarns are white, a result of the weave is the warp-faced side will appear mostly blue while the reverse side, weft-faced side, will appear mostly white.

In denim, the warp is typically 100 percent cotton. But some warp yarns can be a blend with, for example, elastane to allow for warp stretch. And some yarns for other fabrics may contain other fibers, such as polyester or elastane as examples.

In an indigo ring-dyed yarn, the indigo does not fully penetrate to a core of the yarn. Rather, the indigo dye is applied at a surface of the cotton yarn and diffuses toward the interior of the yarn. So when the yarn is viewed cross-sectionally, the indigo dyed material will appear as a ring on around an outer edge of the yarn. The shading of the indigo dye will generally lighten in a gradient as a distance increases from the surface of the yarn to the center (or core) of the yarn.

A cross section of a ring-dyed yarn appears somewhat analogous to a total solar eclipse, one which occurred Aug. 21, 2017 (i.e., the filing date of this patent) in North America. The core of yarn is like the umbra (Latin for "shadow") and is the innermost and darkest part of a shadow, where the light source is completely blocked by the occluding body. And the solar corona that appears during totality is analogous to the ring-dyed outer surface of the yarn.

During laser finishing, the laser removes a selected amount of the surface of the indigo dyed yarn (e.g., blue color) to reveal a lighter color (e.g., white color) of the inner core of the ring-dyed yarn. The more of the indigo dyed material that is removed, the lighter the color (e.g., lighter shade of blue). The more of the indigo dyed material that remains, the darker the color (e.g., deeper shade of blue). The laser can be controlled precisely to remove a desired amount of material to achieve a desired shade of blue in a desired place or position on the material.

With laser finishing, a finish can be applied (e.g., printed or burned via the laser) onto apparel (e.g., jeans and denim garments) that will appear similar to or indistinguishable from a finish obtained using traditional processing techniques (e.g., dry abrasion, wet processing, and oxidation). Laser finishing of apparel is less costly and is faster than traditional finishing techniques and also has reduced environmental impact (e.g., eliminating the use of harsh chemical agents and reducing waste).

FIGS. 22-25 show how the laser alters the color of ring-dyed yarn. FIG. 22 shows a laser beam 2207 striking a ring-dyed yarn 2213 having indigo-dyed fibers 2218 and white core fibers 2222. The laser removes the dyed fibers, which can be by vaporizing or otherwise destroying the cotton fiber via heat or high temperature that the laser beam causes.

FIG. 23 shows the laser using a first power level setting or first exposure time setting, or a combination of these, to remove some of the dyed fibers, but not revealing any of the white core fibers. The undyed fibers remain covered. There is no color change.

FIG. 24 shows the laser using a second power level setting or second exposure time setting, or a combination of these, to remove more of the dyed fibers than in FIG. 23. The second power level is greater than the first power level, or the second exposure time setting is greater than the first exposure time setting, or a combination of these. The result is some of the undyed fibers are revealed. There is a color change, subtle highlighting.

FIG. 25 shows the laser using a third power level setting or third exposure time setting, or a combination of these, to remove even more of the dyed fibers than in FIG. 24. The third power level is greater than the second power level, or the third exposure time setting is greater than the second exposure time setting, or a combination of these. The result is more of the undyed fibers are revealed. There is a color change, brighter highlighting.

As shown in FIG. 2, before laser 207, the fabric can be prepared 216 for the laser, which may be referred to as a base preparation, and can include a prelaser wash. This step helps improves the results of the laser. After the laser, there can be a postlaser wash 219. This wash can clean or remove any residue caused by the laser, such as removing any charring (which would appear as brown or slightly burning). There can be additional finish 221, which may be including tinting, softening, or fixing, to complete finishing.

Figure 3:
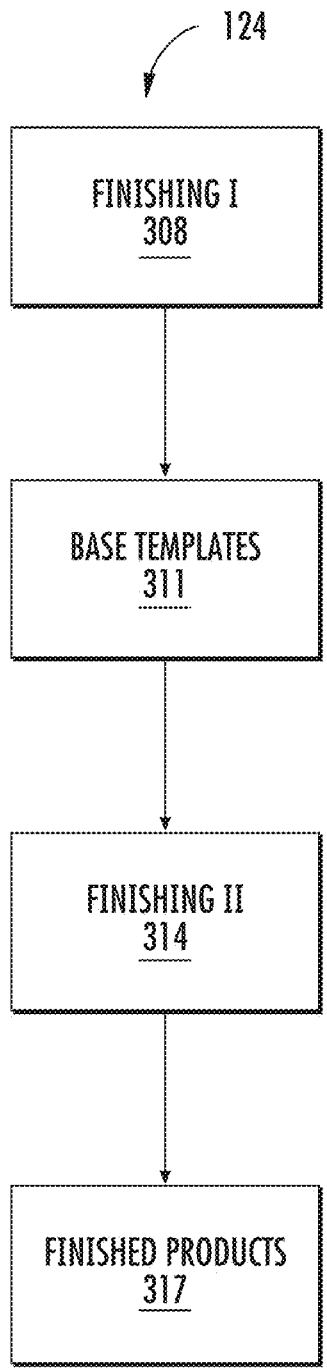
FIG. 3 shows a flow for finishing in two finishing steps and using base templates.

FIG. 3 shows a technique where finishing is divided into two finishing steps, finishing I and finishing II. Finishing I 308 is an initial finishing to create base templates 311. With finishing II 314, each base template can be used to manufacture multiple final finishes 317.

Figure 4:
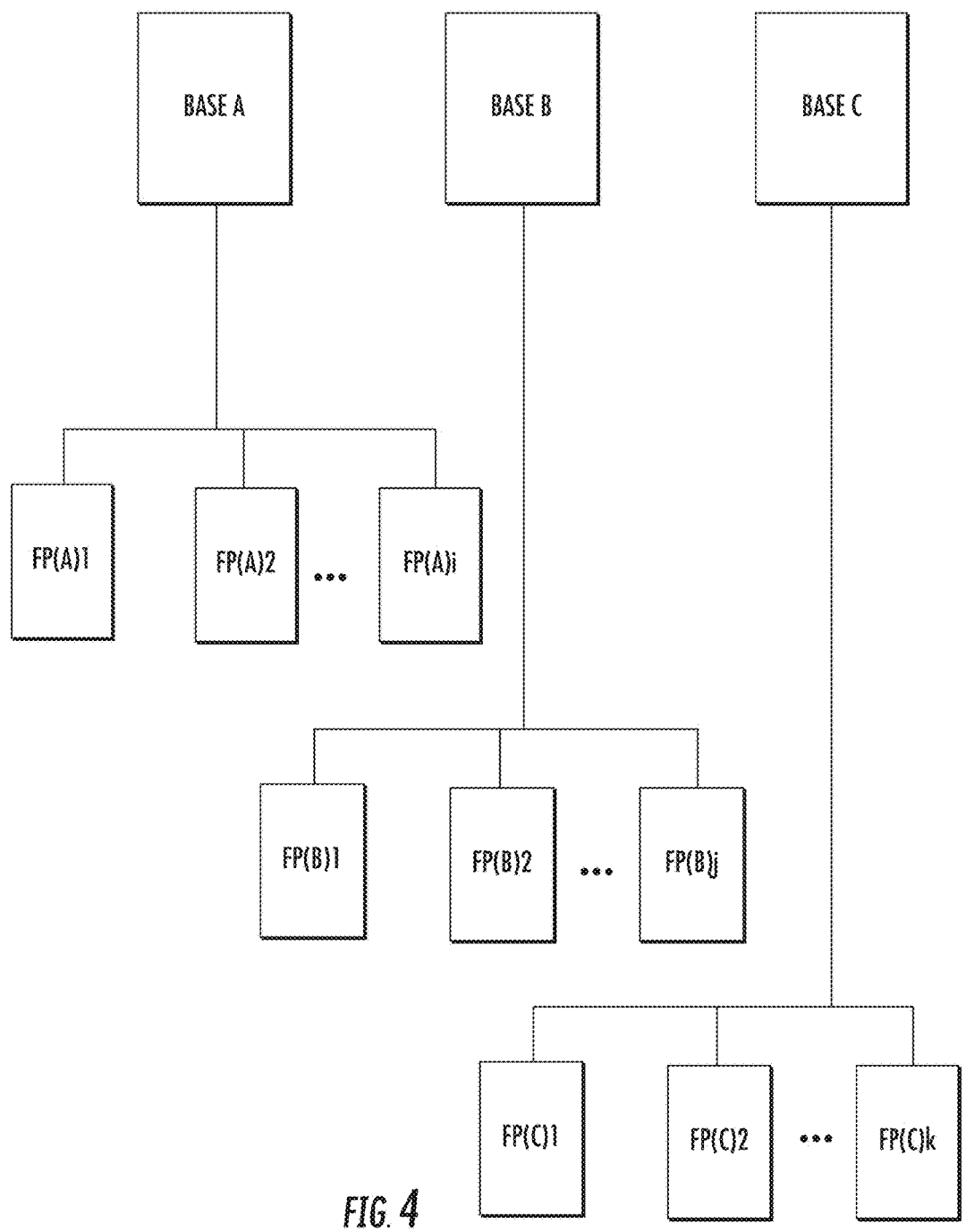
FIG. 4 shows multiple base templates and multiple resulting finished products from each of these templates.

FIG. 4 shows multiple base templates, base A, base B, and base C. Finishing II can include the laser process show in FIG. 2 and described above. Base A is lasered with different designs to obtain various final product based on base A (e.g., FP(A)1 to FP(A)i, where i is an integer). Base B is lasered with different designs to obtain various final product based on base B (e.g., FP(B)1 to FP(B)j, where j is an integer). Base C is lasered with different designs to obtain various final product based on base C (e.g., FP(C)1 to FP(C)k, where k is an integer). Each base can be used to obtain a number of different final designs. For example, the integers i, j, and k can have different values.

Figure 5:
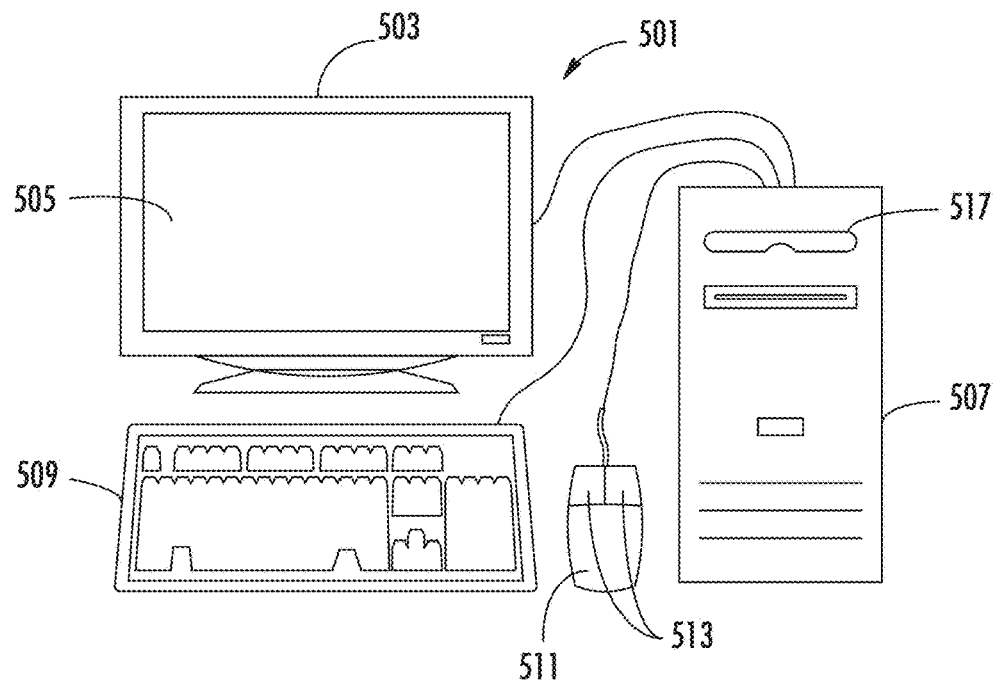
FIG. 5 shows a computer system which is part of a laser finishing system for apparel.

A system of laser finishing can include a computer to control or monitor operation, or both. FIG. 5 shows an example of a computer that is component of a laser finishing system. The computer may be a separate unit that is connected to a laser system, or may be embedded in electronics of the laser system. In an embodiment, the invention includes software that executes on a computer workstation system, such as shown in FIG. 5.

FIG. 5 shows a computer system 501 that includes a monitor 503, screen 505, enclosure 507, keyboard 509, and mouse 511. Mouse 511 may have one or more buttons such as mouse buttons 513. Enclosure 507 (may also be referred to as a system unit, cabinet, or case) houses familiar computer components, some of which are not shown, such as a processor, memory, mass storage devices 517, and the like.

Mass storage devices 517 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive or solid state drive (SSD)), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 517. The source code of the software of the present invention may also be stored or reside on mass storage device 517 (e.g., hard disk, magnetic disk, tape, or CD-ROM). As a further example, code of the invention may be transmitted via wires, radio waves, or through a network such as the Internet.

Figure 6:
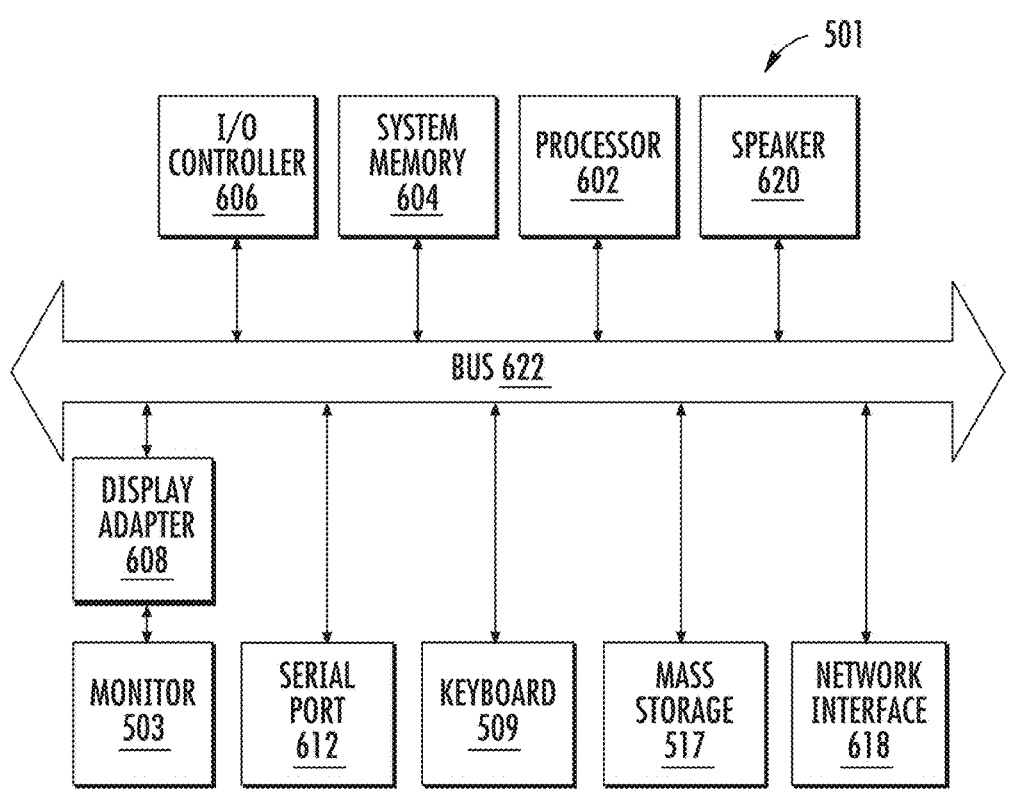
FIG. 6 shows a system block diagram of the computer system

FIG. 6 shows a system block diagram of computer system 501 used to execute software of the present invention. As in FIG. 5, computer system 501 includes monitor 503, keyboard 509, and mass storage devices 517. Computer system 501 further includes subsystems such as central processor 602, system memory 604, input/output (I/O) controller 606, display adapter 608, serial or universal serial bus (USB) port 612, network interface 618, and speaker 620. The invention may also be used with computer systems with additional or fewer subsystems. For example, a computer system could include more than one processor 602 (i.e., a multiprocessor system) or the system may include a cache memory.

The processor may be a dual core or multicore processor, where there are multiple processor cores on a single integrated circuit. The system may also be part of a distributed computing environment. In a distributed computing environment, individual computing systems are connected to a network and are available to lend computing resources to another system in the network as needed. The network may be an internal Ethernet network, Internet, or other network.

Arrows such as 622 represent the system bus architecture of computer system 501. However, these arrows are illustrative of any interconnection scheme serving to link the subsystems. For example, speaker 620 could be connected to the other subsystems through a port or have an internal connection to central processor 602. Computer system 501 shown in FIG. 5 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab, SAS, SPSS, JavaScript, AJAX, Java, Python, Erlang, and Ruby on Rails. The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation).

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows 8, Windows 10, Windows CE, Windows Mobile, Windows RT), Symbian OS, Tizen, Linux, HP-UX, UNIX, Sun OS, Solaris, Mac OS X, Apple iOS, Android, Alpha OS, AIX, IRIX32, or IRIX64. Other operating systems may be used. Microsoft Windows is a trademark of Microsoft Corporation. Other operating systems may be used. A computer in a distributed computing environment may use a different operating system from other computers.

Any trademarks or service marks used in this patent are property of their respective owner. Any company, product, or service names in this patent are for identification purposes only. Use of these names, logos, and brands does not imply endorsement.

Furthermore, the computer may be connected to a network and may interface to other computers using this network. For example, each computer in the network may perform part of the task of the many series of steps of the invention in parallel. Furthermore, the network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless (e.g., 2G, 3G, 4G, 3GPP LTE, WiMAX, LTE, LTE Advanced, Flash-OFDM, HIPERMAN, iBurst, EDGE Evolution, UMTS, UMTS-TDD, 1xRDD, and EV-DO). For example, signals from a computer may be transferred, at least in part, wirelessly to components or other computers.

Figure 7:
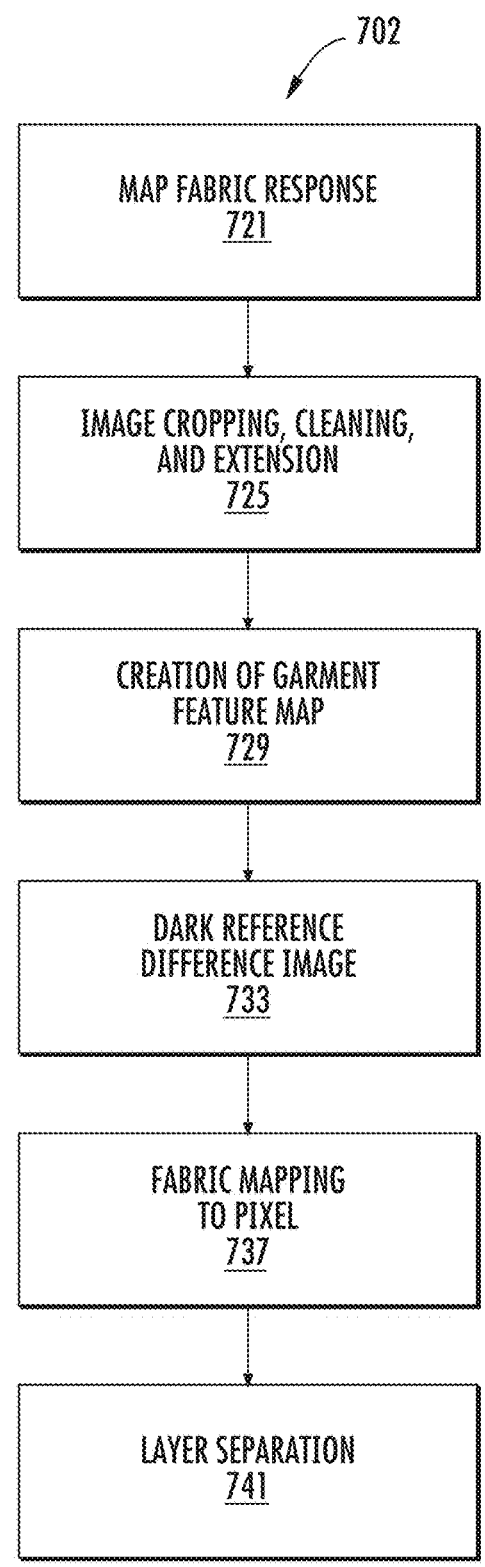
FIG. 7 shows a flow for creating a wear pattern input file for the laser finishing system.

FIG. 7 shows a flow 702 for creating a wear pattern input file for the laser. The input file contains a wear pattern that the laser will use to produce the wear pattern on the garment. It should be understood that the invention is not limited to the specific flows and steps presented. A flow of the invention may have additional steps (not necessarily described in this patent), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data or situation.

Flow 702 includes the following: a map fabric response 721; image cropping, cleaning, and extension 725; creation of garment feature map 729; dark reference difference image 733; fabric mapping to pixel 737; and layer separation 741.

A jeans manufacturer like Levi Strauss & Co. has produced many jeans with a variety of wear patterns. The manufacturer has many existing wear pattern designs, which can include vintage wear patterns. Some wear patterns are referred to as authentic wear patterns which are the result of long-term wear. For example, a cowboy or cowgirl may wear a pair of jeans while ranching tending to cattle, riding houses, and participating in rodeos, and so forth. A miner may wear a pair of jeans while prospecting for gold, mining for coal, excavating a cavern, riding a mine train, and so forth. The result of the worker working in the jeans for a period of time (e.g., five or more years) without washing them will be an authentic wear pattern.

The apparel manufacturer wants to reproduce these existing, vintage, or authentic wear pattern designs (or portions or features of these designs) on garments. A laser system can be used to reproduce the wear pattern on new garments in an accelerated fashion, so that it will not take years to produce a garment.

An approach is to scan or take a photo of an existing garment with a wear pattern. Then with this scan, a laser prints (or burning) the wear pattern on another garment. However, the result of this approach is generally a very poor reproduction of the original wear pattern. The resulting wear pattern typically does not appear realistic, generally appearing flat—where the highs and lows in the coloration appear compressed.

There are reasons why this approach does not work. A reason is the material of the original garment and new garment are different. The laser has not been specifically configured for the characteristics of the material being burned. The scanning process or photo may not be a proper input file to control the laser for burning the pattern accurately.

Another approach for re-creating wear patterns is to enhance scans (e.g., via hand editing or hand drawing) of the existing pattern using a photo editing tool such as Adobe Photoshop. The editing process may use a computer, keyboard, mouse, or pen tablet input device (e.g., Wacom tablet), or any combination of these. This process is generally time consuming because significant manual editing is involved.

Figure 8A:
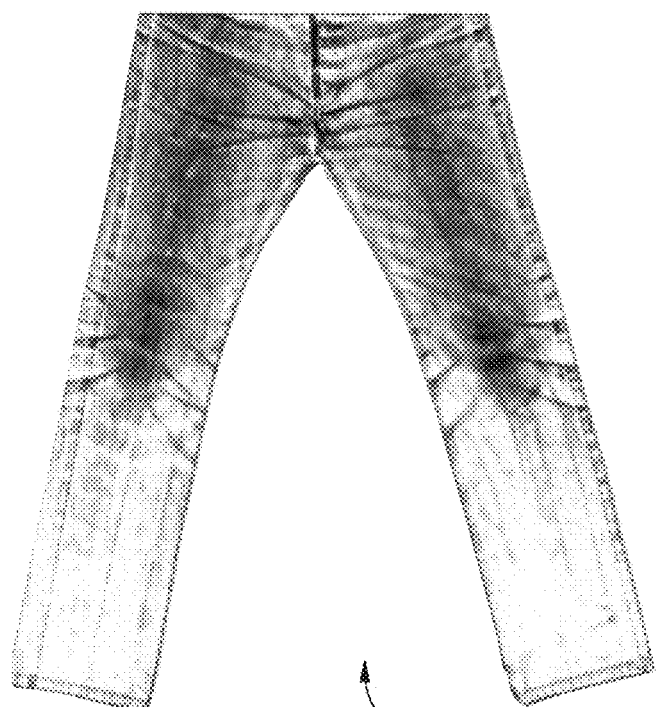
FIGS. 8A and 8B show an image of an existing garment with wear pattern and a processed wear pattern image that can be an input file for a laser.
Figure 8B:

The approach of FIG. 7 takes, referring to FIGS. 8A and 8B, an image 806 of a target or existing garment with wear pattern, extracts garment features and the known fabric response to laser treatment, to generate a wear pattern image 816 that is used as an input file for the laser. Using this approach, the laser can re-create a wear pattern faster and more accurately than any previous approaches. A specific implementation of the technique is implemented in software written using Python source code.

Figure 9:
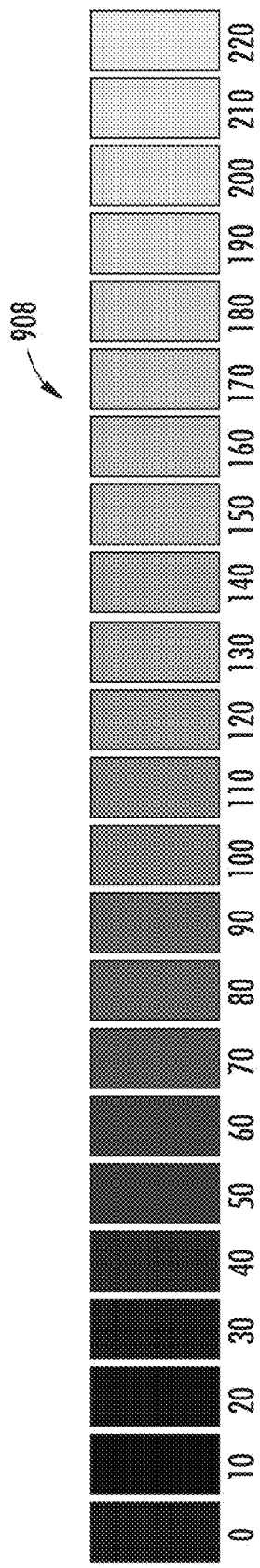
FIG. 9 shows a grayscale map for input to a laser.

In step 721, the technique maps a fabric's response to a laser:

Step 721.1. FIG. 9 shows a grayscale map 908. This map is input (via an input file) to the laser so the laser can burn this grayscale map onto a fabric for which it is desired to obtain the fabric's response characteristics to the laser. The grayscale map has rectangular blocks, each block for different 8-bit grayscale value from 0 to 255. The map has a series of blocks, with an increment value of 10.

In other implementations, other increment values may be used such as 1, 2, 3, 5, 8, 15, 20, or others. Any increment value can be uses as long as there are sufficient data points to accurately plot the fabric response. The grayscale value can be represented by a binary value having any number of bits, such as more or less than 8 bits, 4 bits, 6 bits, 12 bits, 16 bits, 18 bits, 24 bits, 32 bits, or any value above or below these values. The more bits the greater the number of gray levels, and the fewer bits, the fewer the number of gray levels.

Also, the dimensions of each box can vary too. A technique uses an average of the gray value over the entire box. The more constant the base wash is, the narrower the distribution will be. Generally, the dimensions of the box should be sufficient in size (small or large) such that the technique can obtain an accurate average on very uneven base washes (e.g., stone washes).

Figure 10:
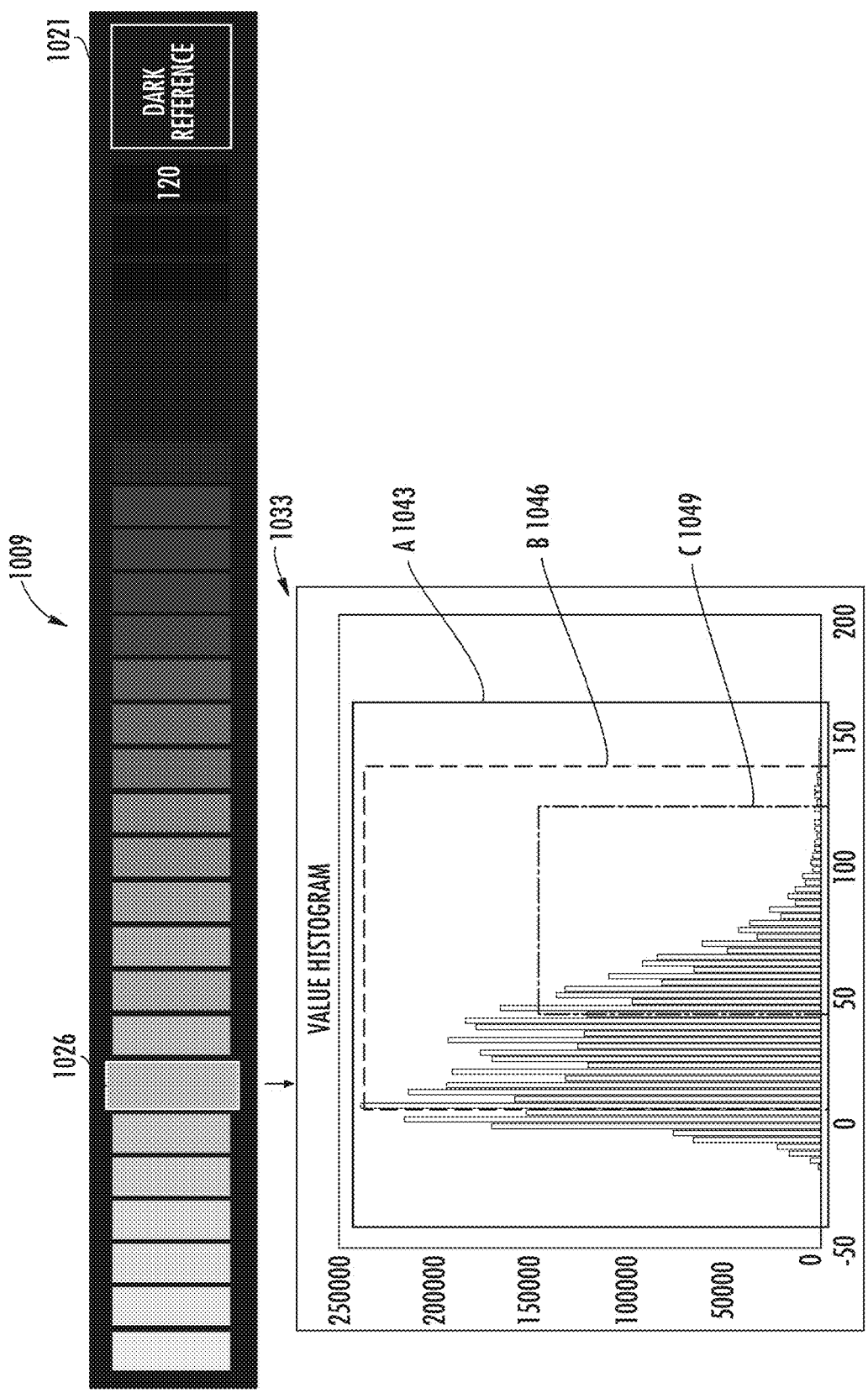
FIG. 10 shows a fabric map that results from burning the grayscale map input onto a fabric.

A known input of grayscale constants (e.g., a grayscale in fixed increments of 10 from 0 (darkest) to 255 (lightest)) is burned by a laser onto a selected fabric (e.g., denim), creating an incremental range of discrete color shades or values. This burn pattern on the fabric can be referred to as a fabric map. FIG. 10 shows a fabric map 1009 that results from burning input grayscale map 908. The fabric map can include an incremental range of color shades or values resulting from the incremental laser treatment on the fabric.

Step 721.2. A color digital image or scan is taken of the fabric map and is converted to grayscale and the differences between each incremental level of intensity and a dark reference value 1021 is calculated. In an implementation, the dark reference value can be based in a region of darkest intensity on the fabric that existed before laser treatment. The dark reference value can be, for example, an average, mean, median, or other function of the pixels in the region. This region can be selected by using a selection polygon to indicate boundaries of the dark reference region. The selection polygon can be a square, rectangle, ellipse, circle, triangle, pentagon, hexagon, octagon, or any other closed polygon shape. The dark reference region can be two or more separate polygons, each of which can be the same or different shape. In other implementations, dark reference value may be a single pixel or point instead of a region.

In an implementation, a color image is represented by binary values from 0-255 in red (R), green (G), and blue (B) layers for each pixel. The grayscale equivalent can be obtained by summing the red, green, and blue values at each pixel. The resulting grayscale image will have values in a range from 0-765 (i.e., 3*255). These values indicate a grayscale value within that range and also can be scaled back into the 0-255 range.

Further, in an implementation, for converting to grayscale, the red, green, and blue layers can be weighted by the user as desired. This may be used to enhance the results, such as to highlight certain features of the pattern. Weighting can be adjusted by selecting a percentage for each layer, where the sum of the percentages is 100. A standard weighting is to weight each color layer equally, such as 0.333 red, 0.333 green, and 0.333 blue. But the user can change the weighting to emphasize certain colors while deemphasizing other colors. For example, the user may want to emphasize the reds and greens in the image, while deemphasizing the blues. An example of a weighting where red and green are weighted greater than other colors while blue is weighted least is: 0.45 red, 0.38 green, and 0.17 blue.

Step 721.3. The burn on the fabric for a particular grayscale input value is not a constant value. Rather, different regions of pixel distributions will yield different fabric maps (i.e., detailed pattern designs) and introduce flexibility for the user later in the steps.

For each box (e.g., box 1026) of the burned fabric, there is a distribution of grayscale pixels, which can be represented using a value histogram 1033. The histogram represents a distribution of grayscale pixels for a rectangular box of the fabric map. The x-axis of the histogram indicates a difference value between a pixel and an average value of all grayscale pixels within the dark reference. Some values in the histogram can be negative because the dark reference average is lighter (or less dark) than some pixels in a rectangular box. The y-axis of the histogram indicates a number of pixels at a particular difference value of the x-axis.

Step 721.4. The fabric mapping process (e.g., creating histograms for a fabric map) can occur automatically using software tools. A user identifies the fabric map (e.g., using a mouse to draw a box identifying the fabric map boundaries) and inputs variables (e.g., number of rectangles, starting grayscale rectangle value, ending grayscale rectangle value, and increment value). The software tools will generate histograms (e.g., histogram 1033) for the boxes or rectangles in the fabric map.

For each box in the fabric map, the technique generates a histogram of the grayscale value distribution. For a fabric map with 25 boxes (255 grayscale levels with an increment value of 10), there will be 25 histograms.

Step 721.5. After the histograms for the fabric map are obtained, these histograms are used to create a graph 1112 (FIG. 11) of the laser-fabric response. The graph contains shows function or curve of the relationship between laser and fabric, which may be referred to as relationship between a gray value difference on fabric versus programmed grayscale. The x-axis gives a needed value shift, while the y-axis gives a grayscale value required.

In a specific implementation, the graph is obtained by using a least squares linear regression algorithm to fit a function to the laser-fabric response. This function is stored for later use.

Figure 11:
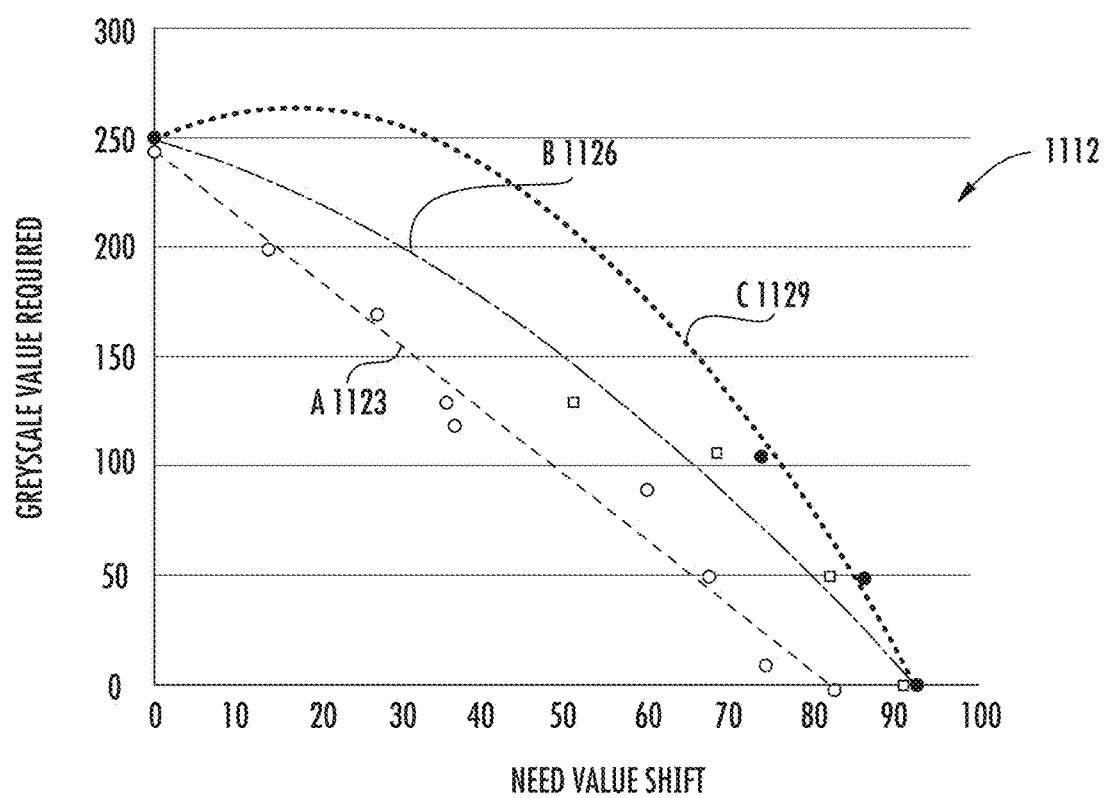
FIG. 11 shows a laser-fabric response graph including curves of a relationship between needed value shift and grayscale value required.

FIG. 11 shows three curves of relationships between needed value shift and grayscale value, curves 1123 (indicated as "A"), 1126 (indicated as "B"), and 1129 (indicated as "C"). These curves correspond to the data within regions 1043 (indicated as "A"), 1046 (indicated as "B"), and 1049 (indicated as "C") of histogram 1033. These curves may be referred to as laser-fabric curves.

After the histograms are generated, the user can select what pixel data to include in creating a function curve. For example, the user can select to include all the pixels of histogram or only a particular portion or subset of the pixels. This feature allows adjust the output curve to obtain improved results when burning to a particular fabric.

As an example, when using all pixel data (represented by region A 1043) in FIG. 10, the resulting curve is curve A 1123. When using a portion of the data (represented by box B 1046) in FIG. 10, the resulting curve is curve B 1126. When using a portion of the data (represented by box C 1049) in FIG. 10, the resulting curve is curve C 1129.

In a specific implementation, the histogram is a count of pixel values separated into 85 bins. Grayscale value from 0-3 go in bin 1, grayscale values from 3-6 go in bin 2, and so forth, until grayscale values that go from 252-255 that go into bin 85. This is a useful representation of the data because this allows a user to select from certain portions of that histogram to make a map.

The technique starts by averaging everything (e.g., A box 1043). This gives you the average fabric response overall. Then if desired we could take the average over the top 50 percent of the values (e.g., B box 1046) and so on with, for example, the C box 1049. This would result in a different (higher) value for the mapping function to use when the technique fits its curve in the regression function. The user can select which mapping to use based on their needs later in the process. These options can use this as a tool to find a "correct" or more accurate mapping to replicate the target garment or may be used for making artistic changes.

Although FIG. 11 shows a graph representation, the laser-fabric response may also be represented by an equation, function, a lookup table or other representation (such as representations use in software), rather than a graph. Then the technique would find the appropriate grayscale value use such representation (e.g., equation, function, a lookup table) for a given needed value shift.

As discussed, typically there are many hundreds or thousands or more fabrics a manufacturer use to produce apparel. For the same garment, fabrics from different mills may be used. The manufacturer will generate a fabric map and a laser-fabric curve for each fabric that they will use for laser finishing. This will allow consistent or improved results when laser finishing a particular wear pattern. For example, laser burning the same pattern onto fabrics from two different mills will produce similar burned results because each fabric or material has its laser-fabric curve.

Returning to FIG. 7, in step 725, to generate a wear pattern input file for the laser, the technique performs image cropping, cleaning, and extraction for an existing wear pattern that is to be reproduced.

Figure 12:
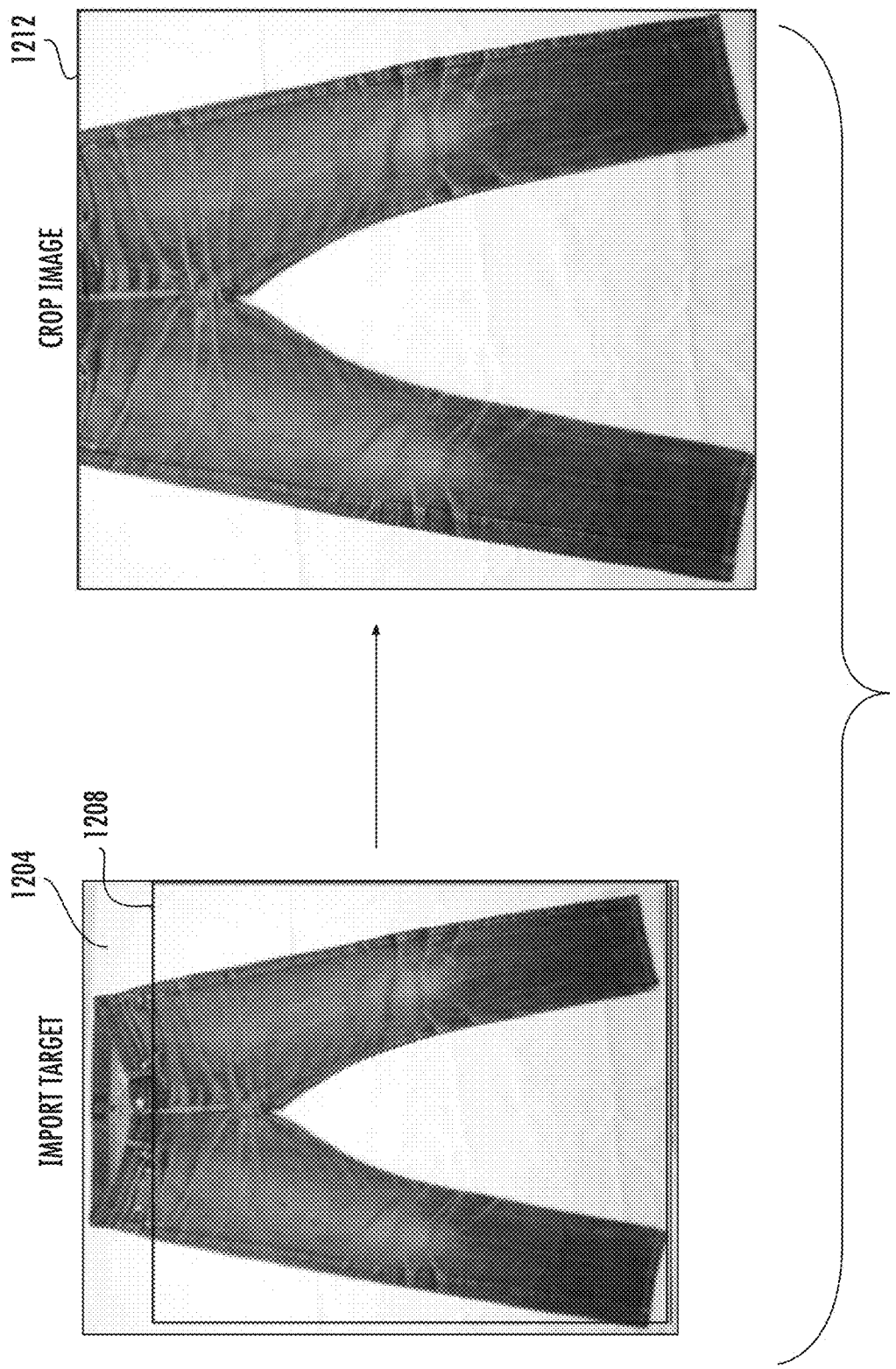
FIG. 12 shows an image of a pair of jeans with a wear pattern that is to be captured and cropping of this image.

Step 725.1. The user selects a target image of a desired garment (e.g., a pair of worn jeans with a desirable pattern of whiskers and wear on the thigh regions) to import. Referring to FIG. 12, a photo 1204 of jeans with wear pattern on a light colored background is selected as an input target. For example, a photo of the jeans can have a resolution of about 5600 vertical pixels by about 3700 horizontal pixels. Other resolutions may be used, more or less than in this example.

Step 725.2. The user crops the digital image (e.g., color digital photo) so that it includes only the target garment on a desired, light colored or white background. The user selects a portion of the photo, indicated by selection box 1208, to crop, which results in a cropped image 1212.

Figure 13:
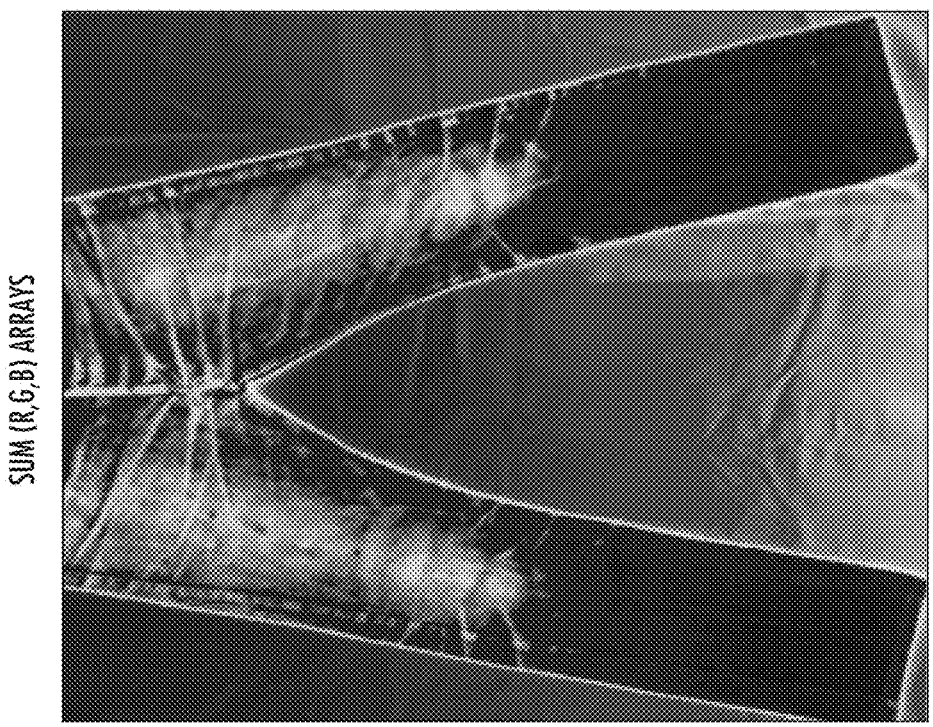
FIG. 13 shows an example of the cropped image processed by the summing of red, green, and blue arrays to extract only the target garment.

Step 725.3. The cropped photo is processed with extraction code where the sum of red, green, and blue arrays is computed as a method to extract only the target garment (not including the background). FIG. 13 shows an example of a processed cropped photo.

Figure 14:
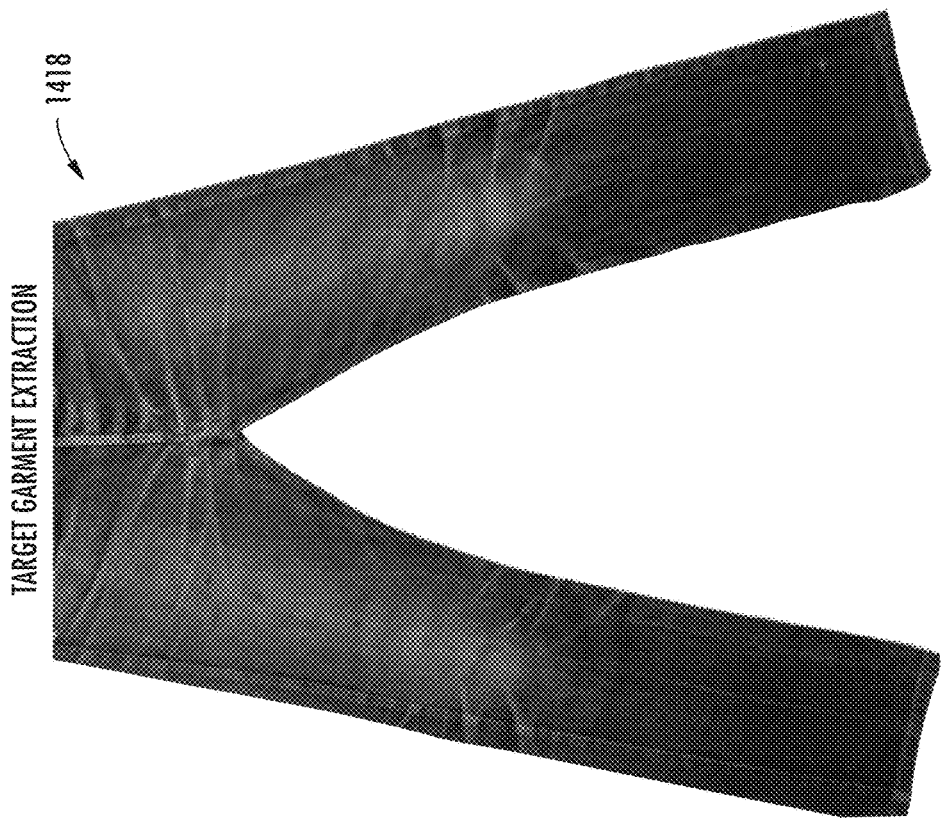
FIG. 14 shows an extracted image of the target garment.

Step 725.4. The extracted image is then ready to be used as the working image that will be used to create an inverted grayscale laser file. FIG. 14 shows an example of an extracted image 1418 of a garment.

An additional processing of texture noise removal can be performed on the extracted image before use as a working image. This additional texture noise removal processing is optional and may be omitted in some implementations. Texture noise removal can be performed before or after the image is converted to into grayscale.

The surface texture of the fabric of a garment can be captured as part of the imaging process. For denim, this surface texture may be due to the twill pattern. Depending on the degree of the surface texture captured in the image, the surface texture can be a significant noise that interferes with the finish pattern that is captured. The surface texture will cause a regular pattern that may be visible in the captured image.

Some surface textures will cause more noise than others. As previously discussed, right hand twill is the most common and can be easily identified by the diagonal pattern that moves from the bottom left of the fabric to the top right. Left hand is woven in the exact opposite direction as right hand twill, starting from the bottom right and moving up to the top left of the fabric. Broken twill is a combination of right hand twill and left hand twill; broken twill alternates left and right at every two warp ends to create a peculiar zig-zag pattern.

In an implementation, noise removal is used for right hand twill only. In an implementation, noise removal is used for left hand twill only. In an implementation, noise removal is used for broken twill only. In an implementation, noise removal is used for right or left hand twill only, not broken twill. In an implementation, noise removal is used for broken twill, not right or left hand twill. In an implementation, noise removal is used for left or broken twill only, not right hand twill.

Noise removal removes noise caused by the fabric's surface texture (e.g., twill line noise). After noise removal, the working image will include only the finish and not the surface texture. A technique for noise removal to detect the surface texture pattern and to subtract, negate, or cancel this surface texture pattern from the extracted image which has the surface texture noise.

As an example, the pattern can be capture by taking an image of the same material as the garment, where the material does not have a finish pattern. The garment or material for capturing the surface texture can be dyed a uniform color. The image of the surface texture can be used a noise filter, and be subtracted from the extracted image, before use as the working image.

In an implementation, the surface texture pattern (e.g, right hand, left hand, or broken twill, or other weave pattern) of material of the garment is detected. Based on the surface pattern detected, an appropriate noise removal pattern is subtracted from the extracted image to obtain a working image without surface pattern noise.

Returning to FIG. 7, in step 729, a garment feature map is created.

Figure 15:
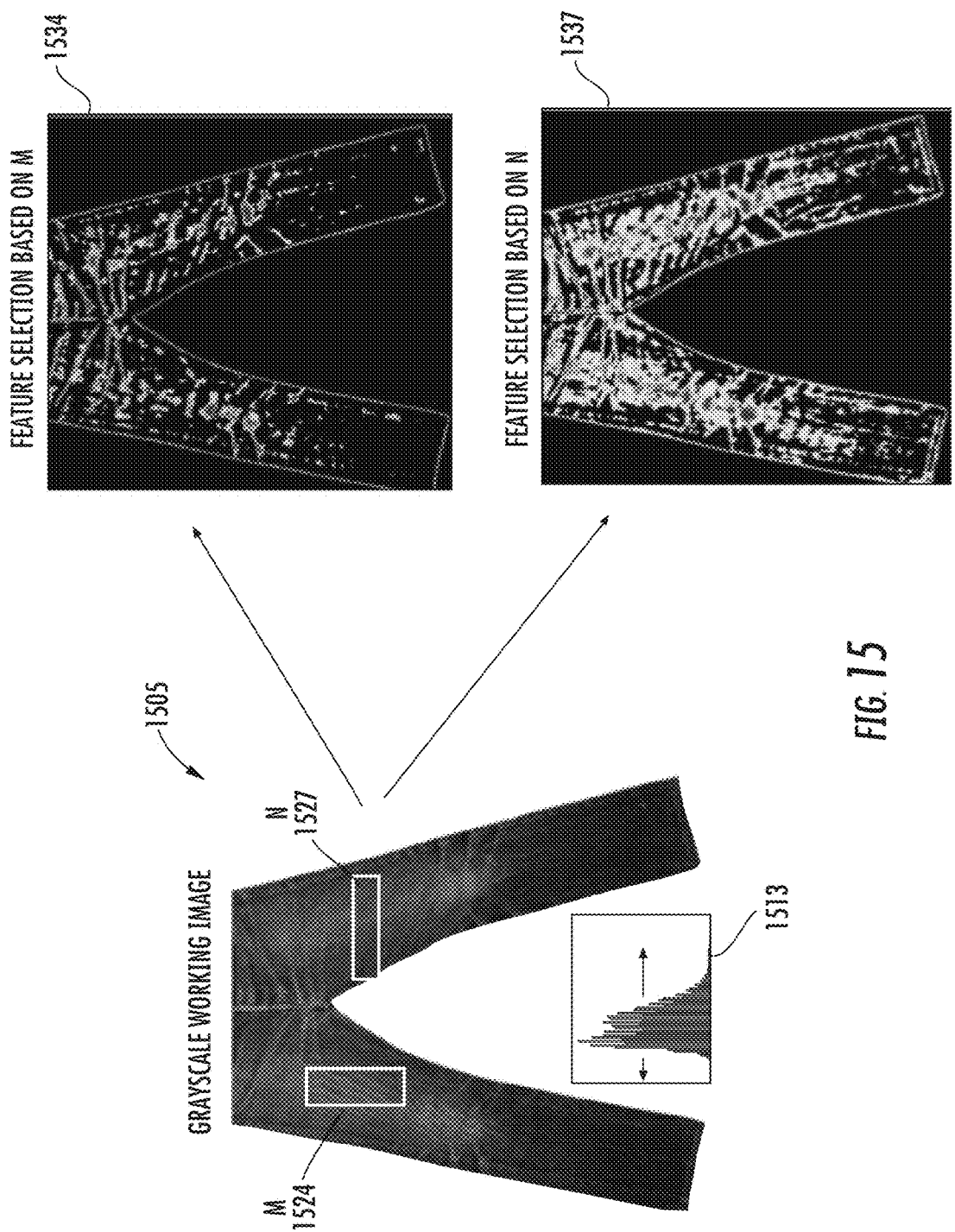
FIG. 15 shows the extracted image converted to a grayscale working image, and using the grayscale image to obtain one or more feature selection images.

Step 729.1. The extracted working image (e.g., image 1418 of FIG. 14) created from step 725.4 above is converted to grayscale, where the conversion is performed so that differences in the image are maximized. FIG. 15 shows an grayscale extracted working image 1505.

Step 729.2. A contrast limited adaptive histogram equalization (CLAHE) algorithm is applied to the image in an effort to extract features from the garment that will later be enhanced or filtered down. A histogram 1513 can be used in the algorithm.

Adaptive histogram equalization is a computer image processing technique used to improve contrast in images. It differs from standard or ordinary histogram equalization in the respect that the adaptive method computes several histograms, each corresponding to a distinct section of the image, and uses them to redistribute the lightness values of the image. It is therefore suitable for improving the local contrast and enhancing the definitions of edges in each region of an image. An adaptive histogram equalization called contrast limited adaptive histogram equalization (CLAHE) prevents overamplifying noise in relatively homogeneous regions of an image by limiting the amplification.

Adaptive histogram equalization improves on this by transforming each pixel with a transformation function derived from a neighborhood region. In its simplest form, each pixel is transformed based on the histogram of a square surrounding the pixel. The derivation of the transformation functions from the histograms is exactly the same as for ordinary histogram equalization: The transformation function is proportional to the cumulative distribution function of pixel values in the neighborhood.

Pixels near the image boundary should be treated specially, because their neighborhood would not lie completely within the image. This applies for example to the pixels to the left or above the blue pixel in the figure. This can be solved by extending the image by mirroring pixel lines and columns with respect to the image boundary. Simply copying the pixel lines on the border is not appropriate, as it would lead to a highly peaked neighborhood histogram.

Contrast limited adaptive histogram equalization differs from ordinary adaptive histogram equalization in its contrast limiting. The contrast limiting procedure should be applied for each neighborhood from which a transformation function is derived.

This is achieved by limiting the contrast enhancement of adaptive histogram equalization. The contrast amplification in the vicinity of a given pixel value is given by the slope of the transformation function. This is proportional to the slope of the neighborhood cumulative distribution function and therefore to the value of the histogram at that pixel value. Contrast limited adaptive histogram equalization limits the amplification by clipping the histogram at a predefined value before computing the cumulative distribution function. This limits the slope of the cumulative distribution function and therefore of the transformation function. The value at which the histogram is clipped, the so-called clip limit, depends on the normalization of the histogram and thereby on the size of the neighborhood region.

Step 729.3. Depending on the range of parameters selected from the histogram as well as the limits placed on contrast, different features can be extracted. Depending on the dimensions of the box used in the contrast limited adaptive histogram equalization algorithm as well as the limits placed on contrast, different features can be extracted.

For example, referring to FIG. 15, the user can select or indicate a box M 1524 or a box N 1527 on the working image. Based on the box M selection, using the contrast limited adaptive histogram equalization algorithm, a feature selection M 1534 is generated. Based on the box N selection, a feature selection N 1537 is generated. In this particular example, feature selection N has larger light regions than feature selection M, generally indicating greater or more contrast between light and dark regions.

Step 729.4. After some user-defined thresholding and filtering, this feature map or feature maps (e.g., feature selection maps M and N) are saved for later use.

Returning to FIG. 7, in step 733, a dark reference difference image is generated.

Step 733.1. The histograms (e.g., histogram 1033) and curves (e.g., graph 1112) of the fabric map for the chosen fabric was calculated as a difference relative to a dark reference (e.g., dark reference 1021). See discussion for step 721 above. To be compatible with the fabric response data (e.g., histograms for fabric map and graph 1112), the work image (e.g., 1418) is converted to be relative (e.g., a difference) to a local dark reference.

Figure 16:
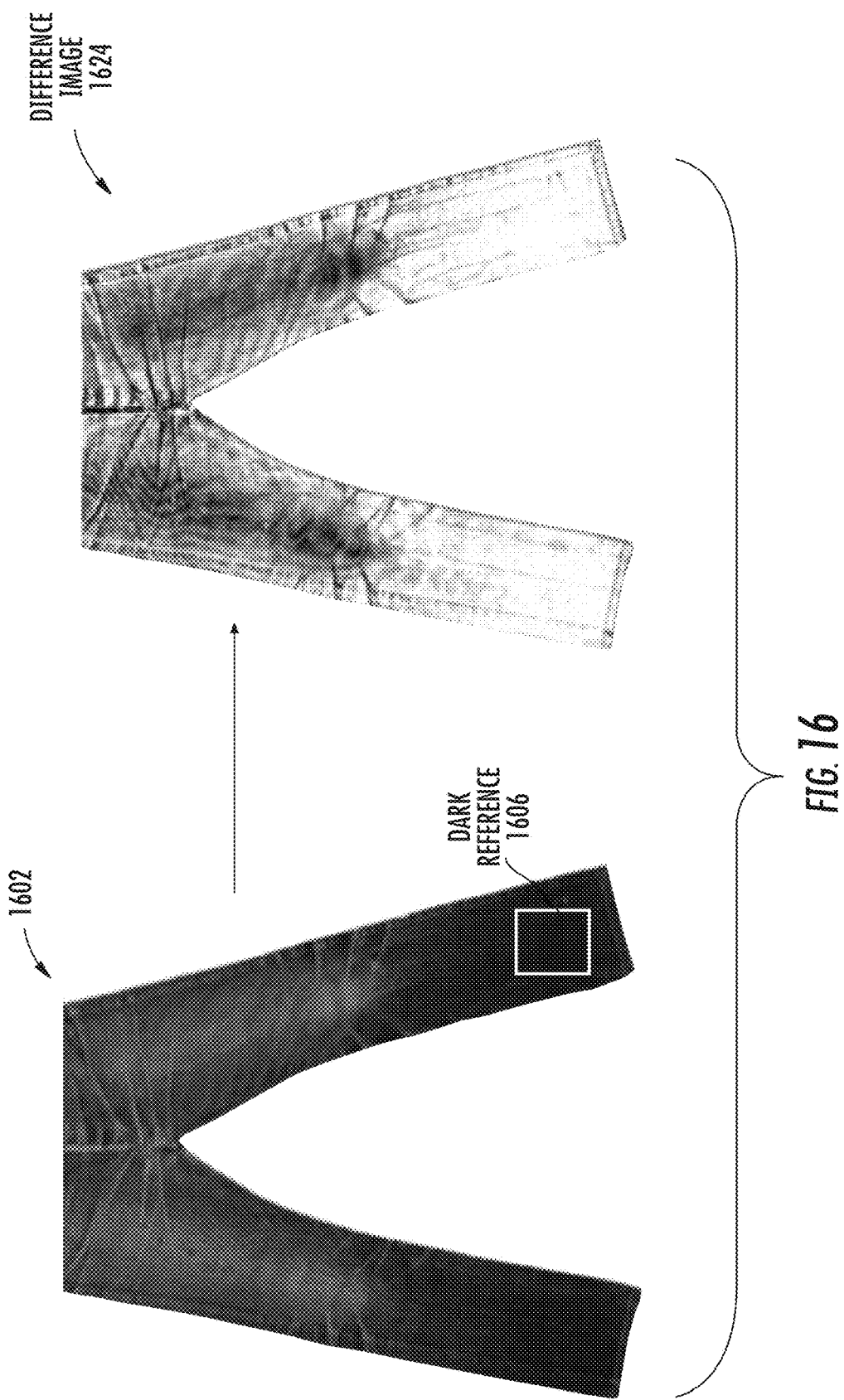
FIG. 16 shows creating a difference image from the grayscale working image.

Step 733.2. In the grayscale working image, the user can identify, select, or define (e.g., by a selection tool) a dark reference (e.g., a darkest point on a selected garment). In FIG. 16, on a working image 1602, the user has selected a dark reference 1606, indicated by a selection box or rectangle.

A dark reference 1021 (FIG. 10) was discussed above for fabric map; the above discussion can apply to dark reference 1606 of the grayscale working image as well. The dark reference value can be, for example, an average, mean, median, or other function of the pixels in the region. This region can be selected by using a selection polygon to indicate boundaries of the dark reference region. The selection polygon can be a square, rectangle, ellipse, circle, triangle, pentagon, hexagon, octagon, or any other closed polygon shape. The dark reference region can be two or more separate polygons, each of which can be the same or different shape. In other implementations, dark reference value may be a single pixel or point instead of a region.

Step 733.3. A difference image 1624 is calculated and generated. Each pixel in the difference image is a value difference between a corresponding pixel in work image 1602 relative to dark reference 1606.

Figure 17:
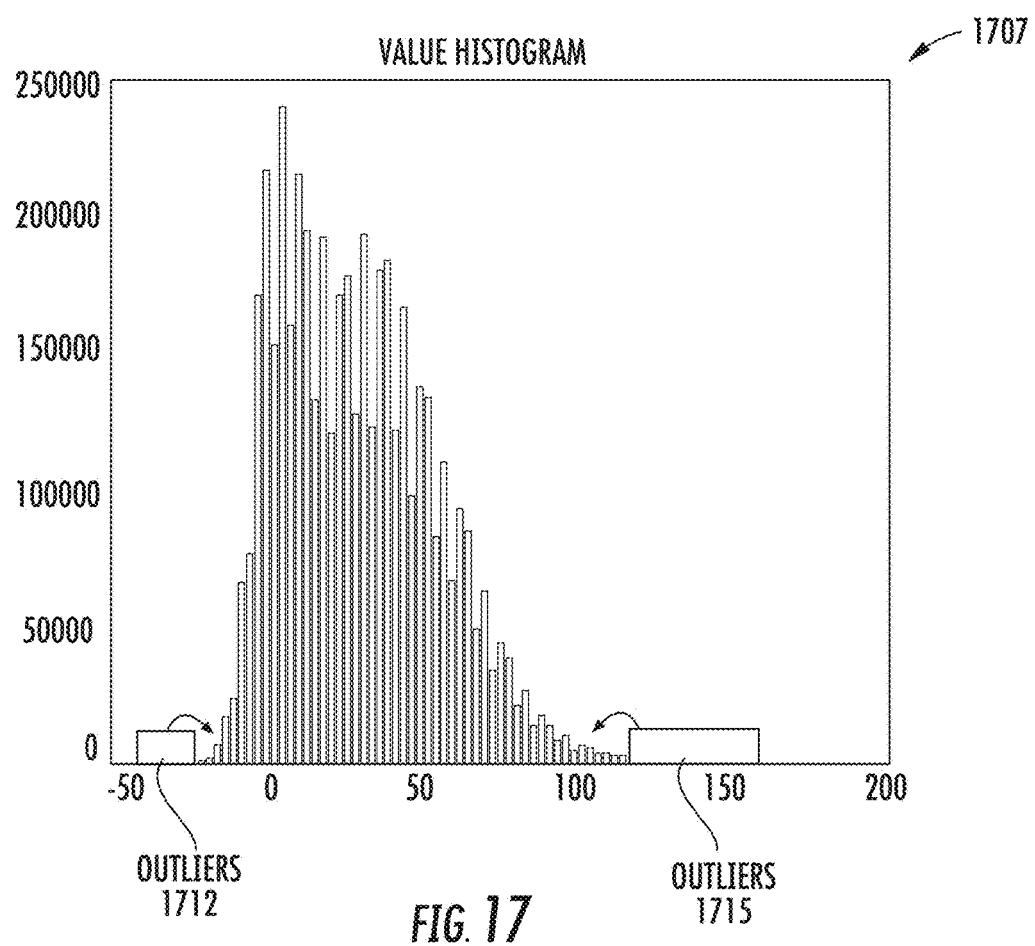
FIG. 17 shows a histogram where outliers are shifted into other bins of the histogram.

After the difference image is calculated, the outlier values (e.g., leading and trailing one one thousandths or other value of image pixel values) in the image are shifted into the last nonoutlier bin. FIG. 17 shows a histogram where outliers 1712 and 1715 are shifted. Outliers 1712 are shifted into a bin to a right (indicated by an arrow) of outliers 1712. Outliers 1715 are shifted into a bin to the left (indicated by an arrow) of outliers 1715. This technique removes noise and makes for a more accurate difference image.

Note that because the difference image shows a difference between the darkest point on the fabric and the specific points (or pixels in the digital file) the image resembles a photographic negative in that the darkest points are the lightest and the lightest points are the darkest). The difference image is an inverse or reverse image, compared to working image 1602.

Step 733.4. The resulting difference image is then shifted to start its minimum value at zero (e.g., grayscale value 0).

In a specific implementation, the difference image is calculated by simple subtraction. The user selects the darkest region on the target garment. Software evaluates that region and assigns it a "value" (e.g., mean or median of the selected region). This value may be referred to as a dark reference value.

The program then loops through each pixel in the image subtracting the dark reference value from each pixel. This if done on its own can result in a poor quality image because of image noise and user variability. So after the initial subtraction the algorithm checks the image for outlier values (e.g., values making up less than one thousandths of the image) and redistributes them into the appropriate place in the image (e.g., the value closets the original value that is not an outlier). After that, the entire image adjusted so that its darkest pixels are at zero. For example, according one technique, any negative values in the image file will not be laser burned onto the garment.

Returning to FIG. 7, in step 737, a fabric mapping to pixel is performed.

Figure 18:
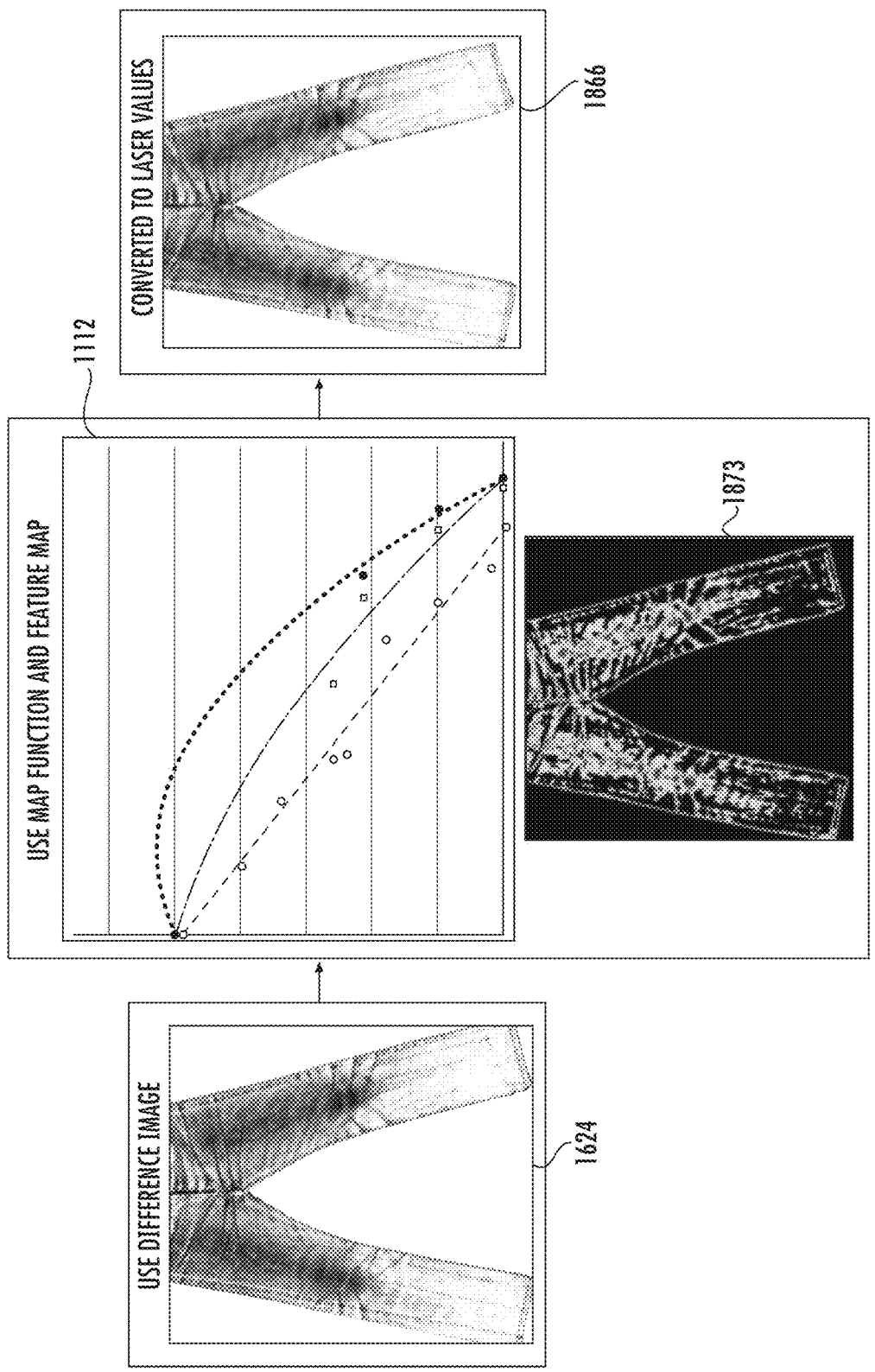
FIG. 18 shows using the difference image to create a laser values image that will be an input file to control operation of the laser during apparel finishing.

Step 737.1. Referring to FIG. 18, difference image 1624 is converted to laser values 1866 to control the laser treatment of the fabric. The laser values are saved in a file. This file can be used as an input file for the laser. This file is used to burn the particular wear pattern on a particular fabric material that laser values 1866 were calculated for by the steps in flow 702 of FIG. 7.

In an implementation, the file is an image file type. Some examples of image file types or file formats include bitmap or raster graphics formats including IMG, TIFF, EXIF, JPEG, GIF, PNG, PBM, PGM, PPM, BMP, and RAW. The compression for the file can be lossless (e.g., TIFF) or lossy (e.g., JPEG). Other image file types or file formats include vector graphics including DXF, SVG, and the like.

Bitmaps or raster graphics are resolution dependent while vector graphics are resolution independent. Raster graphics generally cannot scale up to an arbitrary resolution without loss of apparent quality. This property contrasts with the capabilities of vector graphics, which generally easily scale up to the quality of the device rendering them.

A raster graphics image is a dot matrix data structure representing a generally rectangular grid of pixels, or points of color, viewable via a monitor, paper, or other display medium. A bitmap, such as a single-bit raster, corresponds bit-for-bit with an image displayed on a screen or output medium. A raster is characterized by the width and height of the image in pixels and by the number of bits per pixel (or color depth, which determines the number of colors it can represent).

The BMP file format is an example of a bitmap. The BMP file format, also known as bitmap image file or device independent bitmap (DIB) file format or simply a bitmap, is a raster graphics image file format used to store bitmap digital images, independently of the display device. The BMP file format is capable of storing two-dimensional digital images of arbitrary width, height, and resolution, both monochrome and color, in various color depths, and optionally with data compression, alpha channels, and color profiles.

Step 737.2. Features in the target can be enhanced, as desired by the user, using a feature map 1873. For example, feature selection map M 1534 or N 1537 of FIG. 15 and described in step 729 may be used. The technique to adjust the weighting of the different color layers described above (e.g., selecting a weighting for each color) may be used to create the feature selection maps and variations of these.

In a specific implementation, a technique takes difference image 1624 and uses laser-fabric response graph 1112 to generate laser values image 1866. For a given pixel value from the difference image, a position corresponding to this pixel value is found on the x-axis of laser-fabric response graph 1112. This x-axis value corresponds to a position or point on a curve (e.g., curve B 1126 of graph 1112 in FIG. 11) of the laser-fabric response graph. The y-axis value for this position or point on the curve will be the difference value for the given pixel value and is used in laser values image file 1866. Although a graph representation is described, the laser-fabric response may also be represented by an equation, function, a lookup table, or other representation, instead of a graph.

The user may use (optionally) the feature selection to modify or alter the conversion of the pixel values from difference image 1624 to corresponding pixel values in laser values 1866. First, a technique can normalize the value to between the maximum brightness change seen on the map and the grayscale value that no longer produces a change on the fabric. Then, after the ranges are capped based on fabric response, feature selection mapping is used to select the locations with significant features to a user's liking. The technique allows a user to enhance certain features of the garment (e.g., making them darker so they will be exposed to more laser energy, which will result in lighter regions on the fabric). Users can use feature selection mapping to enhance artistic and design choices.

In an implementation, when using the feature selection, each pixel in the difference image is compared to a corresponding pixel in feature map 1873. A grayscale threshold is selected that corresponds to feature map 1873. When the brightness of the pixel in difference image 1624 is above the grayscale value threshold in feature map 1873, then that pixel will be converted to a laser values 1866 pixel according to a first weighting. When the grayscale value of the pixel in difference image 1624 is at or below the grayscale value threshold in feature map 1873, then that pixel will be converted to a laser values 1866 pixel according to a second weighting. The first weighting and second weighting can be different from each other. Using feature map 1873 in the conversion to laser values 1866 allows selectively further increasing or decreasing the contrast or brightness is some areas of the laser values file.

The first weighting can be greater than second weighting. For example, the first weighting can be 1 and the second weighting can be 0.8. This means than lighter areas will be enhanced and made even brighter, compared to pixels below the grayscale value threshold. The second weighting can be greater than the first weighting. For example, the first weighting can be 0.9 and the second weighting can be 1.6. This means than darker areas will be enhanced and made brighter, compared to pixels below the grayscale value threshold. If the first and second weightings are the same (e.g., 1), this would effectively nullify the use of feature map 1873 to differentiate the pixels.

For normalizing values, a technique can include, for example: a fabric map may have a grayscale range from 0 to 255 (the entire range), while the working image or laser values image may have a more limited range, such as from 40 to 180. Then a technique scales the working image into the fabric map range. The scaling can be linear scaling. For example, a pixel value of 180 would become 255, and 40 would be 0. And values between 40 and 180 would be given by a formula: 180−40=140; 255/120=1.821; 40*1.821=72.84; so (working image value)*1.821− 72.84=new value for difference map or laser values image.

Returning to FIG. 7, in step 741, layer separation is used.

Step 741.1. Layer separation is a technique where a garment is burned by the laser in multiple passes, such as two or more passes. This generally enhances the contrast of the resulting laser burn. Multiple passes may be used for the entire garment or only for one or more portions of a garment.

Depending on the laser hardware being used, multiple passes may be helpful to improve contrast. The input file used to control the laser is separated into multiple layers instead of burning the entire image or pattern in a single file.

FIGS. 19-20 shows a laser values file (e.g., laser values 1866) that has been divided into two layers, a first layer 1906 and a second layer 2029. One layer is input as a first input file to the laser, and burned first, and the other layer is input as a second input file to the laser, and burned second, after the first burn has been finished. Although two layers are described, there can be more than two layers, such as three, four, five, six, seven, or more. There would be a corresponding number of burns to the number of layers.

The first layer may be burned before the second layer, or vice versa. Compared to the second layer, the first layer generally has darker regions, which will cause the laser to burn longer and result in light regions. The resulting burned wear pattern can differ depending on the order in which the layers are burned.

Step 741.2. A software tool can convert an image into the desired number of layers (e.g., 2, 3, 4, 5, or more) with specific intensities on each layer. In an implementation, to separate the laser values file (e.g., laser values 1866), a threshold difference value can be selected. The threshold difference value can be user selectable. For values above this threshold difference value, those will go into a first layer file. And values at or below this threshold difference value, those will go into a second layer file.

For example, software provides a user interface where the user can input or select a percentage of the image be applied to the first or second layer. If the user selects, for example, 50 percent, layer one will print the image with the darkest value being 50 percent of what it was in the original difference image. The second layer will print only the areas in the original image that were in the top 50 percent of the original image; these would be the highlights.

Step 741.3. Layers can be rotated and cropped using a software tool to help isolate certain parts of a design (where it is desirable to use a multiple passes for laser burning). For example, in FIGS. 19-20, only a portion (e.g., left half) of a pair of jeans is shown in images 1906 and 2029. The laser will burn these portions. The images for the layers could be an entire front side of the jeans, back side of the jeans, or different portions of the jeans. The image will reflect the portions of the garment that the user wants to burn using this technique.

Step 741 is optional, and a technique may not include a two-pass or multiple-pass laser burn. Burning a garment using a single pass generally increases the throughput of garment finishing.

Tables A-G present a pseudocode computer program listing of sample software code for a specific implementation of flow 702 of FIG. 7 for creating a wear pattern input file for the laser finishing system. A specific implementation of the source code may be written in a programming language such as Python. Other programming languages can be used.

TABLE A

User Program 1: CLICK, CROP, EXTRACT
Import ("Target Image")-> data represented as an array size (image height, image width, 3)
Magnitude threshold = set by user-> a threshold value
function cropCleanExtract( ):
    PRINT: prompt for user to select region of interest
    CALL: Click and Crop function, passing "Target Image," returns user defined
        rectangular region of interest x1,x2,y1,y2
    CREATE: A "Working Image" ARRAY: defined by the x1,x2,y1,y2 within the
original       target Image
    CALL: Color Pull function, passing "Working Image" returns the garment with the
        background removed and set to reset to white.
    SAVE: Color Pull output image array as is for future use
    CALL: Gray it function passing Color Pull result, returns a grayscale image by
flattening    the image array by a set weighted average of the RGB components
    PLOT: The original Target Image and the cropped and extracted Target Garment
image    so that the user can confirm that extraction happened correctly
    ITERATE: reset Magnitude threshold if needed. Repeat until desired result is
achieved

TABLE B

User Program 2: GARMENT FEATURE MAP
Pre_filter = value of averaging filter window set by user. Noise reduction
Contrast Box X = set the X dimension for the contrast enhancement algorithm
Contrast Box Y = set the Y dimension for the contrast enhancement algorithm
Clipper = set the limiter on the Contrast enhancement algorithm
Post_filter = value of averaging filter window set by user. Noise reduction
Contrast Value Threshold = threshold vale for what will considered a features
function extractfeatures( ):
    IMPORT: work image to array
    IMPORT: reference image
    CALL: Contrast it function, passing "work image" and above parameters, returns
    a new image array of the same size with contrast between high and low enhanced by a
        CLAHE algorithm with the above inputs
    PLOT: The enhanced contrast image array to show user which features will be saved
        based on their settings above
    ITERATE: reset settings if needed. Repeat until desired result is achieved
    PRINT: image array maximums and minimums so that user can use that later in the
        process
    SAVE: feature image array for later use.

TABLE C

User Program 3: DARK REFERENCE
NoiseReducer = set by user. Portion of image histogram distribution to ignore as outliers
function DarkReference( ):
    IMPORT: work image to array
    IMPORT: reference image
    CALL: Click and Crop function, passing "Target Image," returns user defined
        rectangular region of interest x1,x2,y1,y2. This region is selected as the darkest portion of the target garment.
    FOR: pixels that are not pure white replace the current value with (current value - dark reference
    CHECK: for outlier values in the image and remove them. By creating a histogram of
        pixel values, the outlier can be selected and modified to non-outlier values.
    IF: discrepancy is found between the user dark reference and histogram non-outlier dark reference default to histogram method (this can be overridden)
    CREATE: a new image array that is the "difference image."
    PLOT: The difference image array to show user the histogram and illustrate what
        portions of the values have been reassigned.
    ITERATE: reset settings if needed. Repeat until desired result is achieved
    PRINT: difference image array maximums and minimums so that user can use that later in the process
    SAVE: feature image array for later use.

TABLE D

User Program 4: MAP CONVERSION AND LAYERING
map_intercept = intercept from mapping function
x_term = power 1 term in mapping polynomial.
x2_term = power 2 term in mapping polynomial.
x3_term = power 3 term in mapping polynomial. default 0
x4_term = power 4 term in mapping polynomial. default 0
x5_term = power 5 term in mapping polynomial. default 0
x6_term = power 6 term in mapping polynomial. default 0
Number of Layers = set to 1 or 2
Layer1 Percentage = percentage of laser image that goes on layer 1
Max Map Change= the max difference achievable on fabric map
No_value_shift = The grayscale value that creates no change on the
function convert2laser( ):
    IMPORT: Difference Image to array
    NORMALIZE: The difference image to have a difference range between 0 and the max difference from the settings above
    IF: Layers = 1
        CALL: InvertConvert function, passing "Difference
            Image," intercept,x1,x2,x3,x4,x5 and x6, returns the difference image
            scaled to inverted grayscale set by the mapping function to replicate the target garment from the original photograph
        SAVE: Converted image in a single layer for either layering or further
            enhancement
        PLOT: Converted image array to ensure user is satisfied with result
    ELSEIF: Layers = 2
        Cutoff = Layer1 Percentage * max difference value
        Layer1 = is the difference image with a cap of cutoff applied to all values
        Layer2 = is the difference image only where value is > cutoff
        CALL: InvertConvert function, For Layer1 passing "Difference
            Image," intercept,x1,x2,x3,x4,x5 and x6, returns the difference image scaled to inverted grayscale set by the mapping function to replicate the target garment from the original photograph
        CALL: InvertConvert function, For Layer2 passing "Difference
            Image," intercept,x1,x2,x3,x4,x5 and x6, returns the difference image scaled to inverted grayscale set by the mapping function to replicate the target garment from the original photograph
        SAVE: Converted image in two separate layers for either layering or further
            enhancement
        PLOT: Converted image arrays to ensure user is satisfied with result

TABLE E

User Program 5: Enhancement Interface
Threshold for Change = user set value
Amount of Change = user set
Change Operation = user selected
function enhnacement( ):
    IMPORT: Converted Laser file (layer 1 and/or layer 2)
    IMPORT: Feature Map Image Array
        within GUI
    PLOT: Converted Image and Feature Map
    USER SELECTION: of Threshold for Change, Amount of Change
        and Change Operation
    REPLOT: showing image with new user settings
        i.e., User can set to retrieve the locations in the feature map where the values are above or below a certain value (Threshold for Change). The user then assigns the pixels with that same location in the Converted image to be modified by Change Operation (divide subract/generally make darker lighter) and sets what amount Amount

TABLE E-continued of Change.
ITERATE: until user is satisfied with the output.
SAVE: Image arrays for laser finishing.

TABLE F

FABRIC MAPPING:
This will happen before steps 1 through 5 are completed
Number of calibrate references = set by decided map
Increment of calibration references = set by decided map
IMPORT color image of fabric map to image array
LOCATE: calibration targets on map through addition and thresholding of
row in column sums within the array
RECORD = values of map references using know position of calibration
references with respect to calibration targets taking the average of some
part of the pixel distribution. Taking different parts of the map reference
pixel distributions will result in a different mapping functions. These
different mapping functions can be used to create different
effects to either enhance or modify the eventual target garment.
CALIBRATE: fit a polynomial to result data distribution and record that
polynomial for use as input to x1,x2,x3,x4,x5,x6 while in USER STEP 4

TABLE G

FUNCTION COLLECTION FILE:
This file contains all functions listed above. A short description of each is below 1. function Grayit(image)
    take in a color image performs a weighted average of the R G and B components and
    returns a grayscale image. The weights of the averages are selected to enhance color
    features in denim photographs but could be modified to suit any image.
2. function GrayThresh (Gray_image, thresh, set_val)
    goes through an flat image array and replaces values above or below thresh value to
        set_val
3. function sumMagit(image)
    sums the R,G,B components of an image array and outputs the result as a flat sum
    array
4. function filter (image, window):
    goes through each value in an image array and replace it with the average array value
    within the window size
5. function LayerExtract(diff_image, max_diff)
    takes in the difference image and removes unachievable values from the array (values
    above max_diff
6. function InvertConvert(gray_image,intercept,x1,x2,x3,x4,x5,x6)
    applies the mapping function to the difference image
7. function softenDarken (gray_image,percentage)
    allows the user to lighten/darken specific locations in an image by a given percentage
8. function boxit(x1,y1,x2,y2)
    plots a box around the user portion of the image arrays and displays it to the user as
    an overlay to the image
9. function crop_it (image, x_start,x_end,y_start,y_end)
    takes the output from click and crop and makes a new image area using that region
10. function colorPull(image,thresh)
    uses sumMagit above to pull the garment off the background. Does this by calling
    values in the sum matrix above thresh value background and everything else garment.
11. function contrast_it(gray_image, pre_filter, box_y, box_x, clipper, post_filter)
    An implementation of the CLAHE algorithm using the listed settings. Different
    settings pull different features
12. function curveFitter(data_pts,order)
    this takes in data points from the mapping function and fits a polynomial to it of
    specified order. Returns the polynomial constants and the the error value to aid in the
    decision as to whether or not to try a higher order polynomial
13. function ClickandCrop(image)
    this plots the image to a window and records the position of the user mouse click
    down and mouse click up in the creation of a rectangular region of interest. Returns
    the x and y positions of opposite corners deifying a rectangle The above discussion has described the use of a camera to perform imaging and color analysis. In another implementation, a spectrophotometer is used instead or in combination with a camera imaging device.

In an implementation, for example, the fabric or material is placed over the aperture of the spectrophotometer, and an $L^*a^*b^*$ reading is obtained. The $L^*$ reading is used and points are measured across the laser gradient to plot a line. The equation of the line (mx+b) gives the values used. This technique will replace the process of using the average grey-value of each box from an image described above.

In an implementation, a method includes forming a first pattern on a surface of a target fabric material. The first pattern includes a number of color shades where the color shades are lighter shades relative to an original color of the target fabric material. The first pattern is formed by exposing the target fabric material to a laser beam at a variety of laser levels. The obtaining a first image representative of the preexisting finishing pattern can use contrast limited adaptive histogram equalization image processing.

The method includes: from the first pattern created by a laser, obtaining a fabric response characteristic for the target fabric material in response to the laser; providing a first garment having a preexisting finishing pattern; and from the first garment having a preexisting finishing pattern, obtaining a first image representative of the preexisting finishing pattern.

The method includes: from the first image, obtaining a second image representative of the preexisting finishing pattern, where the second image includes a reverse image, compared to the first image; using the second image and the fabric response characteristic, creating a laser values input file; and forming on a second pattern on a surface of a second garment, where the second garment is made of the target fabric material. The second pattern is formed by exposing the second garment to a laser beam controlled by the laser values input file.

In various implementations, the second garment can be an assembled garment having fabric panels of the target fabric material sewn together with thread. The target fabric material can be a denim material. The target fabric material can include woven indigo ring-dyed cotton yarn. The second garment can be denim jeans or "blue jeans."

The obtaining a second image representative of the pre-existing finishing pattern can include: selecting a dark reference in the first image; for each pixel in the first image, calculating a difference value between a pixel value and the dark reference; and storing each difference value in the second image.

The laser levels can be obtained by varying an output of the laser beam by altering a characteristic of a laser waveform such as a frequency, period, pulse width, power, duty cycle, or burning speed. The second pattern can be formed by a single pass of the laser or multiple passes.

The first pattern can be different from the second pattern. The first pattern includes a first region having a first shade, a second having a second shade, and a third region having a third shade. Each first, second, and third regions have the same polygon shape (e.g., rectangle, square, triangle, trapezoid, circle, or other shape). A difference between the first shade and second shade is determined by a first incremental value in a laser input value. A difference between the second shade and third shade is determined by a second incremental value in the laser input value. The second incremental value is the same as the first incremental value.

The obtaining a fabric response characteristic for the target fabric material in response to the laser can includes: for the first region, generating a first histogram for a distribution of pixels in the first region; for the second region, generating a second histogram for a distribution of pixels in the second region; and for the third region, generating a second histogram for a distribution of pixels in the second region.

In an implementation, a system includes an assembled garment made of a fabric material, where the assembled garment will be exposed to a laser beam that will create a finishing pattern on a surface of the assembled garment.

There is a laser that emits the laser beam, where the laser beam will form a finishing pattern on the surface of the fabric material of the assembled garment based on the laser input file. The laser input file is obtained by providing a fabric response characteristic function for the fabric material in response to the laser, providing a preexisting finishing pattern captured from a garment having a finishing pattern, and converting the preexisting finishing pattern based on the fabric response characteristic function into the laser input file. The laser input file can be a reverse image.

The assembled garment can include fabric panels that have been sewn together using thread to form pants legs, a crotch region for the pants, and pocket openings for the pants. Before exposure to the laser, the assembled garment does not have a finishing pattern. The fabric material can use a warp yarn having indigo ring-dyed cotton yarn and undyed weft yarn.

The finishing pattern on the surface of the fabric material of the assembled garment can be formed by removing a selected amount of material from the surface of the fabric material of the assembled garment based on the laser input file. Laser levels at an output of the laser beam are altered based on the laser input file by varying a characteristic of a laser such as a frequency, period, pulse width, power, duty cycle, or burn speed.

In an implementation, a method includes assembling a jeans made from fabric panels of a woven first denim material including a warp having indigo ring-dyed cotton yarn, where the fabric panels are sewn together using thread. A laser input file is created that is representative of a finishing pattern from an existing jeans made from a second denim material. The first denim material has a different fabric characteristic from the second denim material.

The creating the laser input file can include: capturing a target image of the finishing pattern from the existing jeans of the second denim material, and determining values for the laser input file that will result in a finishing pattern on the first denim material to obtain an appearance similar to the target image of the finishing pattern from the existing jeans of the second denim material.

A laser is used to create a finishing pattern on an outer surface of the jeans based on a laser input file. Based on the laser input file, the laser removes selected amounts of material from the surface of the first material at different pixel locations of the jeans. For lighter pixel locations of the finishing pattern, a greater amount of the indigo ring-dyed cotton warp yarn is removed, while for darker pixel locations of the finishing pattern, a lesser amount of the indigo ring-dyed cotton warp yarn is removed. The finishing pattern created can extend across portions of the jeans where two or more fabric panels are joined together by the threads by exposing these portions to the laser.

The first denim material can have a weft yarn that has not been indigo dyed. For the portions of the jeans exposed to the laser where the fabric panels are joined, the fabric panels are joined together using a thread having cotton.

The determining values for the laser input file can include: selecting a dark reference in the target image of the finishing pattern from the existing jeans of the second denim material; for each pixel in the target image, calculating a difference value between a pixel value and the dark reference; and storing each difference value in the laser input file. The laser input file will contain a reverse image compared to target image. The laser can create a finishing pattern on an outer surface of the jeans in a single pass or multiple passes.

The determining values for the laser input file can include forming a first pattern on a surface of a first denim material, where the first pattern includes a number of color shades. The color shades are lighter shades relative to an original color of the target fabric material. And the first pattern is formed by exposing the target fabric material to a laser beam at a variety of laser levels.

The first pattern includes a first region having a first shade, a second region having a second shade, and a third region having a third shade. Each first, second, and third regions can be the same polygon shape. A difference between the first shade and second shade is determined by a first incremental value in a laser input value. A difference between the second shade and third shade is determined by a second incremental value in the laser input value. The second incremental value can be the same as the first incremental value.

The determining values for the laser input file can include obtaining a fabric response characteristic for the first denim material in response to the laser including: for the first region, generating a first histogram for a distribution of pixels in the first region; for the second region, generating a second histogram for a distribution of pixels in the second region; and for the third region, generating a second histogram for a distribution of pixels in the second region.

The capturing a target image of the finishing pattern from the existing jeans of the second denim material can include using contrast limited adaptive histogram equalization image processing. When using a laser to create a finishing pattern, different laser levels are obtained by varying an output of the laser beam by altering a characteristic of the laser such as frequency, period, pulse width, power, duty cycle, or burning speed.

The determining values for the laser input file can include: providing a fabric response characteristic function for the first denim material in response to the laser; and converting the target image of the finishing pattern from the existing jeans of the second denim material based on the fabric response characteristic function for the first denim material into values for the laser input file. The laser input file can be a reverse image as compared to target image.

The first denim material can have a first surface texture characteristic that is different from a second surface texture characteristic of the second denim material. The first denim material can have a first dye characteristic that is different from a second dye characteristic of the second denim material. The first denim material can have a first base fabric color characteristic (e.g., color shade or color tint) that is different from a second base fabric color characteristic of the second denim material. The first denim material can have a first yarn characteristic (e.g., ring dye effect) that is different from a second yarn characteristic of the second denim material. For example, the thickness of the ring dyed region can be different. The diameter of the core region can be different.

Further, the first denim material can have a first yarn weight characteristic that is different from a second yarn weight characteristic of the second denim material. The first denim material can have a first yarn diameter characteristic that is different from a second yarn diameter characteristic of the second denim material. The first denim material can have a first yarn twist characteristic (e.g., number of twists) that is different from a second yarn twist characteristic of the second denim material.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
assembling a garment made from fabric panels of a woven first material comprising a warp comprising indigo ring-dyed cotton yarn, wherein the fabric panels are sewn together using thread;
creating a laser input file that is representative of a finishing pattern from an existing garment made from a second material, wherein the first material comprises a different fabric characteristic from the second material, and the creating the laser input file comprises
capturing a target image of the finishing pattern from the existing garment of the second material, and
determining values for the laser input file that will result in a finishing pattern on the first material to obtain an appearance similar to the target image of the finishing pattern from the existing garment of the second material, wherein the determining values for the laser input file comprises
selecting a dark reference in the target image of the finishing pattern from the existing garment of the second material,
for each pixel in the target image, calculating a difference value between a pixel value and the dark reference, and
storing each difference value in the laser input file, wherein the laser input file comprises a reverse image compared to the target image; and
using a laser to create a finishing pattern on an outer surface of the garment based on the laser input file, wherein based on the laser input file, the laser removes selected amounts of material from the surface of the first material at different pixel locations of the garment,
for lighter pixel locations of the finishing pattern, a greater amount of the indigo ring-dyed cotton warp yarn is removed, while for darker pixel locations of the finishing pattern, a lesser amount of the indigo ring-dyed cotton warp yarn is removed, and
the finishing pattern created can extend across portions of the garment where two or more fabric panels are joined together by thread by exposing these portions to the laser.

2. The method of claim 1 wherein the first material comprises a denim and the second material comprises a denim.

3. The method of claim 1 wherein the garment comprises at least one of a pair of jeans, shirt, short, jacket, vest, or skirt.

4. The method of claim 1 wherein the garment and the existing garment are of the same type of garment.

5. The method of claim 1 wherein the finishing pattern created by the laser on the garment includes a wear pattern comprising at least one of combs or honeycombs, whiskers, stacks, or train tracks, or a combination.

6. The method of claim 1 wherein the finishing pattern on the existing garment was not created by a laser.

7. The method of claim 1 wherein the first material comprises a weft comprising yarn that has not been indigo dyed.

8. The method of claim 1 wherein for the portions of the garment exposed to the laser where the fabric panels are joined, the fabric panels are joined together using a thread comprising cotton.

9. The method of claim 1 wherein the using a laser to create a finishing pattern on an outer surface of the garment comprises a single pass of the laser.

10. The method of claim 1 wherein the using a laser to create a finishing pattern on an outer surface of the garment comprises multiple passes of the laser.

11. The method of claim 1 wherein the determining values for the laser input file comprises:
forming a first pattern on a surface of the first material, wherein the first pattern comprises a plurality of color shades, the color shades are lighter shades relative to an original color of the first material, and the first pattern is formed by exposing the first material to a laser beam at a variety of laser levels,
the first pattern comprises a first region comprising a first shade, a second region comprising a second shade, and a third region comprising a third shade, and
a difference between the first shade and second shade is determined by a first incremental value in a laser input value, a difference between the second shade and third shade is determined by a second incremental value in the laser input value, and the second incremental value is the same as the first incremental value.

12. The method of claim 11 wherein the determining values for the laser input file comprises obtaining a fabric response characteristic for the first material in response to a laser comprising:
for the first region, generating a first histogram for a distribution of pixels in the first region;
for the second region, generating a second histogram for a distribution of pixels in the second region; and
for the third region, generating a third histogram for a distribution of pixels in the third region.

13. The method of claim 1 wherein the capturing a target image of the finishing pattern from the existing garment of the second material comprises using contrast limited adaptive histogram equalization image processing.

14. The method of claim 1 wherein when using the laser to create a finishing pattern, different laser levels are obtained by varying an output of the laser beam by altering a characteristic of the laser comprising at least one of a frequency, period, pulse width, power, duty cycle, or burning speed.

15. The method of claim 1 wherein the determining values for the laser input file comprises:
providing a fabric response characteristic function for the first material in response to a laser; and
converting the target image of the finishing pattern from the existing garment of the second material based on the fabric response characteristic function for the first material into values for the laser input file, and the laser input file comprises a reverse image, compared to the target image.

16. The method of claim 1 wherein the first material comprises a first surface texture characteristic which is different from a second surface texture characteristic of the second material.

17. The method of claim 1 wherein the first material comprises a first dye characteristic which is different from a second dye characteristic of the second material.

18. The method of claim 1 wherein the first material comprises a first base fabric color characteristic which is different from a second base fabric color characteristic of the second material.

19. The method of claim 1 wherein the first material comprises a first yarn characteristic which is different from a second yarn characteristic of the second material.

20. The method of claim 1 wherein the first material comprises a first yarn weight characteristic which is different from a second yarn weight characteristic of the second material.

21. The method of claim 1 wherein the first material comprises a first yarn diameter characteristic which is different from a second yarn diameter characteristic of the second material.

22. The method of claim 1 wherein the first material comprises a first yarn twist characteristic which is different from a second yarn twist characteristic of the second material.

23. A method comprising:
providing an assembled garment made from fabric panels of a woven first material comprising a warp comprising indigo ring-dyed cotton yarn, wherein the fabric panels are sewn together using thread;
providing a laser input file that is representative of a finishing pattern from an existing garment made from a second material, wherein the finishing pattern on the existing garment was not created by a laser, and the laser input file was obtained by
capturing a target image of the finishing pattern from the existing garment of the second material, and
determining values for the laser input file that will result in a finishing pattern on the first material to obtain an appearance similar to the target image of the finishing pattern from the existing garment of the second material, wherein the determining values for the laser input file comprises
selecting a dark reference in the target image of the finishing pattern from the existing garment of the second material,
for each pixel in the target image, calculating a difference value between a pixel value and the dark reference, and
storing each difference value in the laser input file, wherein the laser input file comprises a reverse image compared to the target image; and
using a laser to create a finishing pattern on an outer surface of the assembled garment based on the laser input file, wherein based on the laser input file, the laser removes selected amounts of material from the surface of the first material at different pixel locations of the assembled garment,
for lighter pixel locations of the finishing pattern, a greater amount of the indigo ring-dyed cotton warp yarn is removed, while for darker pixel locations of the finishing pattern, a lesser amount of the indigo ring-dyed cotton warp yarn is removed, and
the finishing pattern created can extend across portions of the assembled garment where two or more fabric panels are joined together by thread by exposing these portions to the laser.

24. The method of claim 23 wherein the first material comprises a denim and the second material comprises a denim, the garment and the existing garment comprise jeans, and the finishing pattern created by the laser on the garment includes a wear pattern comprising at least one of combs or honeycombs, whiskers, stacks, or train tracks, or a combination.

25. The method of claim 23 wherein the first material comprises a weft comprising yarn that has not been indigo dyed.

26. The method of claim 25 wherein the first material comprises a first base fabric color characteristic which is different from a second base fabric color characteristic of the second material.

27. The method of claim 23 wherein for the portions of the garment exposed to the laser where the fabric panels are joined, the fabric panels are joined together using a thread comprising cotton.

28. The method of claim 23 wherein the using a laser to create a finishing pattern on an outer surface of the garment comprises a single pass of the laser.

29. The method of claim 23 wherein the using a laser to create a finishing pattern on an outer surface of the garment comprises multiple passes of the laser.

30. The method of claim 23 wherein the determining values for the laser input file comprises:
forming a first pattern on a surface of the first material, wherein the first pattern comprises a plurality of color shades, the color shades are lighter shades relative to an original color of the first material, and the first pattern is formed by exposing the first material to a laser beam at a variety of laser levels, the first pattern comprises a first region comprising a first shade, a second region comprising a second shade, and a third region comprising a third shade, and a difference between the first shade and second shade is determined by a first incremental value in a laser input value, a difference between the second shade and third shade is determined by a second incremental value in the laser input value, and the second incremental value is the same as the first incremental value.

31. The method of claim 30 wherein the determining values for the laser input file comprises obtaining a fabric response characteristic for the first material in response to a laser comprising:

for the first region, generating a first histogram for a distribution of pixels in the first region;

for the second region, generating a second histogram for a distribution of pixels in the second region; and for the third region, generating a third histogram for a distribution of pixels in the third region.

32. The method of claim 23 wherein the capturing a target image of the finishing pattern from the existing garment of the second material comprises using contrast limited adaptive histogram equalization image processing.

33. The method of claim 23 wherein when using the laser to create a finishing pattern, different laser levels are obtained by varying an output of the laser beam by altering a characteristic of the laser comprising at least one of a frequency, period, pulse width, power, duty cycle, or burning speed.

34. The method of claim 23 wherein the determining values for the laser input file comprises:

providing a fabric response characteristic function for the first material in response to a laser; and converting the target image of the finishing pattern from the existing garment of the second material based on the fabric response characteristic function for the first material into values for the laser input file, and the laser input file comprises a reverse image, compared to the target image.

35. The method of claim 23 wherein the first material comprises a first surface texture characteristic which is different from a second surface texture characteristic of the second material.

36. The method of claim 23 wherein the first material comprises a first dye characteristic which is different from a second dye characteristic of the second material.

37. The method of claim 23 wherein the first material comprises a first base fabric color characteristic which is different from a second base fabric color characteristic of the second material.

38. The method of claim 23 wherein the first material comprises a first yarn characteristic which is different from a second yarn characteristic of the second material.

39. The method of claim 23 wherein the first material comprises a first yarn weight characteristic which is different from a second yarn weight characteristic of the second material.

40. The method of claim 23 wherein the first material comprises a first yarn diameter characteristic which is different from a second yarn diameter characteristic of the second material.

41. The method of claim 23 wherein the first material comprises a first yarn twist characteristic which is different from a second yarn twist characteristic of the second material.

42. A method comprising:

assembling a pair of jeans made from fabric panels of a woven first denim material comprising a warp comprising indigo ring-dyed cotton yarn, wherein the fabric panels are sewn together using thread;

creating a laser input file that is representative of a finishing pattern from an existing pair of jeans made from a second denim material, wherein the first denim material comprises a different fabric characteristic from the second denim material, and the creating the laser input file comprises capturing a target image of the finishing pattern from the existing jeans of the second denim material, and determining values for the laser input file that will result in a finishing pattern on the first denim material to obtain an appearance similar to the target image of the finishing pattern from the existing jeans of the second denim material, wherein the determining values for the laser input file comprises selecting a dark reference in the target image of the finishing pattern from the existing jeans of the second denim material, for each pixel in the target image, calculating a difference value between a pixel value and the dark reference, and storing each difference value in the laser input file, wherein the laser input file comprises a reverse image compared to the target image; and using a laser to create a finishing pattern on an outer surface of the jeans based on the laser input file, wherein based on the laser input file, the laser removes selected amounts of material from the surface of the first material at different pixel locations of the jeans, for lighter pixel locations of the finishing pattern, a greater amount of the indigo ring-dyed cotton warp yarn is removed, while for darker pixel locations of the finishing pattern, a lesser amount of the indigo ring-dyed cotton warp yarn is removed, and the finishing pattern created can extend across portions of the jeans where two or more fabric panels are joined together by thread by exposing these portions to the laser.

43. The method of claim 42 wherein the first denim material comprises a weft comprising yarn that has not been indigo dyed.

44. The method of claim 42 wherein for the portions of the jeans exposed to the laser where the fabric panels are joined, the fabric panels are joined together using a thread comprising cotton.

45. The method of claim 42 wherein the using a laser to create a finishing pattern on an outer surface of the jeans comprises a single pass of the laser.

46. The method of claim 42 wherein the using a laser to create a finishing pattern on an outer surface of the jeans comprises multiple passes of the laser.

47. The method of claim 42 wherein the capturing a target image of the finishing pattern from the existing jeans of the second denim material comprises using contrast limited adaptive histogram equalization image processing.

48. The method of claim 42 wherein when using the laser to create a finishing pattern, different laser levels are obtained by varying an output of the laser beam by altering a characteristic of the laser comprising at least one of a frequency, period, pulse width, power, duty cycle, or burning speed.

49. The method of claim 42 wherein the first denim material comprises a first surface texture characteristic which is different from a second surface texture characteristic of the second denim material.

50. The method of claim 42 wherein the first denim material comprises a first dye characteristic which is different from a second dye characteristic of the second denim material.

51. The method of claim 42 wherein the first denim material comprises a first base fabric color characteristic which is different from a second base fabric color characteristic of the second denim material.

52. The method of claim 42 wherein the first denim material comprises a first yarn characteristic which is different from a second yarn characteristic of the second denim material.

53. The method of claim 42 wherein the first denim material comprises a first yarn weight characteristic which is different from a second yarn weight characteristic of the second denim material.

54. The method of claim 42 wherein the first denim material comprises a first yarn diameter characteristic which is different from a second yarn diameter characteristic of the second denim material.

55. The method of claim 42 wherein the first denim material comprises a first yarn twist characteristic which is different from a second yarn twist characteristic of the second denim material.

56. The method of claim 42 wherein the finishing pattern on the existing jeans was not created by a laser.

57. The method of claim 42 wherein the finishing pattern created by the laser on the jeans includes a wear pattern comprising at least one of combs or honeycombs, whiskers, stacks, or train tracks, or a combination.

58. A method comprising:
assembling a pair of jeans made from fabric panels of a woven first denim material comprising a warp comprising indigo ring-dyed cotton yarn, wherein the fabric panels are sewn together using thread;
creating a laser input file that is representative of a finishing pattern from an existing pair of jeans made from a second denim material, wherein the first denim material comprises a different fabric characteristic from the second denim material, and the creating the laser input file comprises
capturing a target image of the finishing pattern from the existing jeans of the second denim material, and
determining values for the laser input file that will result in a finishing pattern on the first denim material to obtain an appearance similar to the target image of the finishing pattern from the existing jeans of the second denim material, wherein the determining values for the laser input file comprises
forming a first pattern on a surface of the first denim material, wherein the first pattern comprises a plurality of color shades, the color shades are lighter shades relative to an original color of the first denim material, and the first pattern is formed by exposing the first denim material to a laser beam at a variety of laser levels,
the first pattern comprises a first region comprising a first shade, a second region comprising a second shade, and a third region comprising a third shade, each first, second, and third regions comprise a polygon shape, and
a difference between the first shade and second shade is determined by a first incremental value in a laser input value, a difference between the second shade and third shade is determined by a second incremental value in the laser input value, and the second incremental value is the same as the first incremental value; and
using a laser to create a finishing pattern on an outer surface of the jeans based on the laser input file, wherein based on the laser input file, the laser removes selected amounts of material from the surface of the first material at different pixel locations of the jeans,
for lighter pixel locations of the finishing pattern, a greater amount of the indigo ring-dyed cotton warp yarn is removed, while for darker pixel locations of the finishing pattern, a lesser amount of the indigo ring-dyed cotton warp yarn is removed, and
the finishing pattern created can extend across portions of the jeans where two or more fabric panels are joined together by thread by exposing these portions to the laser.

59. The method of claim 58 wherein the finishing pattern on the existing jeans was not created by a laser.

60. The method of claim 58 wherein the first denim material comprises a weft comprising yarn that has not been indigo dyed.

61. The method of claim 58 wherein for the portions of the jeans exposed to the laser where the fabric panels are joined, the fabric panels are joined together using a thread comprising cotton.

62. The method of claim 58 wherein the determining values for the laser input file comprises:
selecting a dark reference in the target image of the finishing pattern from the existing jeans of the second denim material;
for each pixel in the target image, calculating a difference value between a pixel value and the dark reference; and
storing each difference value in the laser input file, wherein the laser input file comprises a reverse image compared to the target image.

63. The method of claim 58 wherein the using a laser to create a finishing pattern on an outer surface of the jeans comprises a single pass of the laser.

64. The method of claim 58 wherein the using a laser to create a finishing pattern on an outer surface of the jeans comprises multiple passes of the laser.

65. The method of claim 58 wherein the capturing a target image of the finishing pattern from the existing jeans of the second denim material comprises using contrast limited adaptive histogram equalization image processing.

66. The method of claim 58 wherein when using the laser to create a finishing pattern, different laser levels are obtained by varying an output of the laser beam by altering a characteristic of the laser comprising at least one of a frequency, period, pulse width, power, duty cycle, or burning speed.

67. The method of claim 58 wherein the first denim material comprises a first surface texture characteristic which is different from a second surface texture characteristic of the second denim material.

68. The method of claim 58 wherein the first denim material comprises a first dye characteristic which is different from a second dye characteristic of the second denim material.

69. The method of claim 58 wherein the first denim material comprises a first base fabric color characteristic which is different from a second base fabric color characteristic of the second denim material.

70. The method of claim 58 wherein the first denim material comprises a first yarn characteristic which is different from a second yarn characteristic of the second denim material.

71. The method of claim 58 wherein the first denim material comprises a first yarn weight characteristic which is different from a second yarn weight characteristic of the second denim material.

72. The method of claim 58 wherein the first denim material comprises a first yarn diameter characteristic which is different from a second yarn diameter characteristic of the second denim material.

73. The method of claim 58 wherein the first denim material comprises a first yarn twist characteristic which is different from a second yarn twist characteristic of the second denim material.

74. The method of claim 58 wherein the finishing pattern created by the laser on the jeans includes a wear pattern comprising at least one of combs or honeycombs, whiskers, stacks, or train tracks, or a combination.

75. A method comprising:
  assembling a pair of jeans made from fabric panels of a woven first denim material comprising a warp comprising indigo ring-dyed cotton yarn, wherein the fabric panels are sewn together using thread;
  creating a laser input file that is representative of a finishing pattern from an existing pair of jeans made from a second denim material, wherein the first denim material comprises a different fabric characteristic from the second denim material, and the creating the laser input file comprises
  capturing a target image of the finishing pattern from the existing jeans of the second denim material, and
  determining values for the laser input file that will result in a finishing pattern on the first denim material to obtain an appearance similar to the target image of the finishing pattern from the existing jeans of the second denim material, wherein the determining values for the laser input file comprises:
  forming a first pattern on a surface of the first denim material, wherein the first pattern comprises a plurality of color shades, the color shades are lighter shades relative to an original color of the first denim material, and the first pattern is formed by exposing the first denim material to a laser beam at a variety of laser levels,
  the first pattern comprises a first region comprising a first shade, a second region comprising a second shade, and a third region comprising a third shade, each first, second, and third regions comprise a polygon shape,
  a difference between the first shade and second shade is determined by a first incremental value in a laser input value, a difference between the second shade and third shade is determined by a second incremental value in the laser input value, and the second incremental value is the same as the first incremental value, and
  obtaining a fabric response characteristic for the first denim material in response to the laser comprising
  for the first region, generating a first histogram for a distribution of pixels in the first region,
  for the second region, generating a second histogram for a distribution of pixels in the second region, and
  for the third region, generating a third histogram for a distribution of pixels in the third region; and
  using a laser to create a finishing pattern on an outer surface of the jeans based on the laser input file, wherein based on the laser input file, the laser removes selected amounts of material from the surface of the first material at different pixel locations of the jeans,
  for lighter pixel locations of the finishing pattern, a greater amount of the indigo ring-dyed cotton warp yarn is removed, while for darker pixel locations of the finishing pattern, a lesser amount of the indigo ring-dyed cotton warp yarn is removed, and
  the finishing pattern created can extend across portions of the jeans where two or more fabric panels are joined together by thread by exposing these portions to the laser.

76. The method of claim 75 wherein the finishing pattern on the existing jeans was not created by a laser.

77. The method of claim 75 wherein the first denim material comprises a weft comprising yarn that has not been indigo dyed.

78. The method of claim 75 wherein for the portions of the jeans exposed to the laser where the fabric panels are joined, the fabric panels are joined together using a thread comprising cotton.

79. The method of claim 75 wherein the determining values for the laser input file comprises:
  selecting a dark reference in the target image of the finishing pattern from the existing jeans of the second denim material;
  for each pixel in the target image, calculating a difference value between a pixel value and the dark reference; and
  storing each difference value in the laser input file, wherein the laser input file comprises a reverse image compared to the target image.

80. The method of claim 75 wherein the using a laser to create a finishing pattern on an outer surface of the jeans comprises a single pass of the laser.

81. The method of claim 75 wherein the using a laser to create a finishing pattern on an outer surface of the jeans comprises multiple passes of the laser.

82. The method of claim 75 wherein the capturing a target image of the finishing pattern from the existing jeans of the second denim material comprises using contrast limited adaptive histogram equalization image processing.

83. The method of claim 75 wherein when using the laser to create a finishing pattern, different laser levels are obtained by varying an output of the laser beam by altering a characteristic of the laser comprising at least one of a frequency, period, pulse width, power, duty cycle, or burning speed.

84. The method of claim 75 wherein the first denim material comprises a first surface texture characteristic which is different from a second surface texture characteristic of the second denim material.

85. The method of claim 75 wherein the first denim material comprises a first dye characteristic which is different from a second dye characteristic of the second denim material.

86. The method of claim 75 wherein the first denim material comprises a first base fabric color characteristic which is different from a second base fabric color characteristic of the second denim material.

87. The method of claim 75 wherein the first denim material comprises a first yarn characteristic which is different from a second yarn characteristic of the second denim material.

88. The method of claim 75 wherein the first denim material comprises a first yarn weight characteristic which is different from a second yarn weight characteristic of the second denim material.

89. The method of claim 75 wherein the first denim material comprises a first yarn diameter characteristic which is different from a second yarn diameter characteristic of the second denim material.

90. The method of claim 75 wherein the first denim material comprises a first yarn twist characteristic which is different from a second yarn twist characteristic of the second denim material.

91. The method of claim 75 wherein the finishing pattern created by the laser on the jeans includes a wear pattern comprising at least one of combs or honeycombs, whiskers, stacks, or train tracks, or a combination.

92. A method comprising:
assembling a pair of jeans made from fabric panels of a woven first denim material comprising a warp comprising indigo ring-dyed cotton yarn, wherein the fabric panels are sewn together using thread;
creating a laser input file that is representative of a finishing pattern from an existing pair of jeans made from a second denim material, wherein the first denim material comprises a different fabric characteristic from the second denim material, and the creating the laser input file comprises
capturing a target image of the finishing pattern from the existing jeans of the second denim material, and
determining values for the laser input file that will result in a finishing pattern on the first denim material to obtain an appearance similar to the target image of the finishing pattern from the existing jeans of the second denim material, wherein the determining values for the laser input file comprises
providing a fabric response characteristic function for the first denim material in response to a laser, and
converting the target image of the finishing pattern from the existing jeans of the second denim material based on the fabric response characteristic function for the first denim material into values for the laser input file, and the laser input file comprises a reverse image, compared to the target image; and
using a laser to create a finishing pattern on an outer surface of the jeans based on the laser input file, wherein based on the laser input file, the laser removes selected amounts of material from the surface of the first material at different pixel locations of the jeans,
for lighter pixel locations of the finishing pattern, a greater amount of the indigo ring-dyed cotton warp yarn is removed, while for darker pixel locations of the finishing pattern, a lesser amount of the indigo ring-dyed cotton warp yarn is removed, and
the finishing pattern created can extend across portions of the jeans where two or more fabric panels are joined together by thread by exposing these portions to the laser.

93. The method of claim 92 wherein the finishing pattern on the existing jeans was not created by a laser.

94. The method of claim 92 wherein the first denim material comprises a weft comprising yarn that has not been indigo dyed.

95. The method of claim 92 wherein for the portions of the jeans exposed to the laser where the fabric panels are joined, the fabric panels are joined together using a thread comprising cotton.

96. The method of claim 92 wherein the determining values for the laser input file comprises:
selecting a dark reference in the target image of the finishing pattern from the existing jeans of the second denim material;
for each pixel in the target image, calculating a difference value between a pixel value and the dark reference; and
storing each difference value in the laser input file, wherein the laser input file comprises a reverse image compared to the target image.

97. The method of claim 92 wherein the using a laser to create a finishing pattern on an outer surface of the jeans comprises a single pass of the laser.

98. The method of claim 92 wherein the using a laser to create a finishing pattern on an outer surface of the jeans comprises multiple passes of the laser.

99. The method of claim 92 wherein the determining values for the laser input file comprises:
forming a first pattern on a surface of the first denim material, wherein the first pattern comprises a plurality of color shades, the color shades are lighter shades relative to an original color of the first denim material, and the first pattern is formed by exposing the first denim material to a laser beam at a variety of laser levels,
the first pattern comprises a first region comprising a first shade, a second region comprising a second shade, and a third region comprising a third shade, and
a difference between the first shade and second shade is determined by a first incremental value in a laser input value, a difference between the second shade and third shade is determined by a second incremental value in the laser input value, and the second incremental value is the same as the first incremental value.

100. The method of claim 99 wherein the determining values for the laser input file comprises obtaining a fabric response characteristic for the first denim material in response to a laser comprising:
for the first region, generating a first histogram for a distribution of pixels in the first region;
for the second region, generating a second histogram for a distribution of pixels in the second region; and
for the third region, generating a third histogram for a distribution of pixels in the third region.

101. The method of claim 92 wherein the capturing a target image of the finishing pattern from the existing jeans of the second denim material comprises using contrast limited adaptive histogram equalization image processing.

102. The method of claim 92 wherein when using the laser to create a finishing pattern, different laser levels are obtained by varying an output of the laser beam by altering a characteristic of the laser comprising at least one of a frequency, period, pulse width, power, duty cycle, or burning speed.

103. The method of claim 92 wherein the first denim material comprises a first surface texture characteristic which is different from a second surface texture characteristic of the second denim material.

104. The method of claim 92 wherein the first denim material comprises a first dye characteristic which is different from a second dye characteristic of the second denim material.

105. The method of claim 92 wherein the first denim material comprises a first base fabric color characteristic which is different from a second base fabric color characteristic of the second denim material.

106. The method of claim 92 wherein the first denim material comprises a first yarn characteristic which is different from a second yarn characteristic of the second denim material.

107. The method of claim 92 wherein the first denim material comprises a first yarn weight characteristic which is different from a second yarn weight characteristic of the second denim material.

108. The method of claim 92 wherein the first denim material comprises a first yarn diameter characteristic which is different from a second yarn diameter characteristic of the second denim material.

109. The method of claim 92 wherein the first denim material comprises a first yarn twist characteristic which is different from a second yarn twist characteristic of the second denim material.

110. The method of claim 92 wherein the finishing pattern created by the laser on the jeans includes a wear pattern comprising at least one of combs or honeycombs, whiskers, stacks, or train tracks, or a combination.

111. A method comprising:
assembling a garment made from fabric panels of a woven first material comprising a warp comprising indigo ring-dyed cotton yarn, wherein the fabric panels are sewn together using thread;
creating a laser input file that is representative of a finishing pattern from an existing garment made from a second material, wherein the first material comprises a different fabric characteristic from the second material, and the creating the laser input file comprises
capturing a target image of the finishing pattern from the existing garment of the second material, and
determining values for the laser input file that will result in a finishing pattern on the first material to obtain an appearance similar to the target image of the finishing pattern from the existing garment of the second material, wherein the determining values for the laser input file comprises
providing a fabric response characteristic function for the first material in response to a laser, and
converting the target image of the finishing pattern from the existing garment of the second material based on the fabric response characteristic function for the first material into values for the laser input file, and the laser input file comprises a reverse image, compared to the target image; and
using a laser to create a finishing pattern on an outer surface of the garment based on the laser input file, wherein based on the laser input file, the laser removes selected amounts of material from the surface of the first material at different pixel locations of the garment,
for lighter pixel locations of the finishing pattern, a greater amount of the indigo ring-dyed cotton warp yarn is removed, while for darker pixel locations of the finishing pattern, a lesser amount of the indigo ring-dyed cotton warp yarn is removed, and
the finishing pattern created can extend across portions of the garment where two or more fabric panels are joined together by thread by exposing these portions to the laser.

112. The method of claim 111 wherein the finishing pattern on the existing garment was not created by a laser.

113. The method of claim 111 wherein the first material comprises a denim and the second material comprises a denim.

114. The method of claim 111 wherein the garment comprises at least one of a pair of jeans, shirt, short, jacket, vest, or skirt.

115. The method of claim 111 wherein the garment and the existing garment are of the same type of garment.

116. The method of claim 111 wherein the finishing pattern created by the laser on the garment includes a wear pattern comprising at least one of combs or honeycombs, whiskers, stacks, or train tracks, or a combination.

117. The method of claim 111 wherein the first material comprises a weft comprising yarn that has not been indigo dyed.

118. The method of claim 111 wherein for the portions of the garment exposed to the laser where the fabric panels are joined, the fabric panels are joined together using a thread comprising cotton.

119. The method of claim 111 wherein the determining values for the laser input file comprises:
selecting a dark reference in the target image of the finishing pattern from the existing garment of the second material;
for each pixel in the target image, calculating a difference value between a pixel value and the dark reference; and
storing each difference value in the laser input file.

120. The method of claim 111 wherein the using a laser to create a finishing pattern on an outer surface of the garment comprises a single pass of the laser.

121. The method of claim 111 wherein the using a laser to create a finishing pattern on an outer surface of the garment comprises multiple passes of the laser.

122. The method of claim 111 wherein the determining values for the laser input file comprises:
forming a first pattern on a surface of the first material, wherein the first pattern comprises a plurality of color shades, the color shades are lighter shades relative to an original color of the first material, and the first pattern is formed by exposing the first material to a laser beam at a variety of laser levels,
the first pattern comprises a first region comprising a first shade, a second region comprising a second shade, and a third region comprising a third shade, and
a difference between the first shade and second shade is determined by a first incremental value in a laser input value, a difference between the second shade and third shade is determined by a second incremental value in the laser input value, and the second incremental value is the same as the first incremental value.

123. The method of claim 122 wherein the determining values for the laser input file comprises obtaining a fabric response characteristic for the first material in response to a laser comprising:
for the first region, generating a first histogram for a distribution of pixels in the first region;
for the second region, generating a second histogram for a distribution of pixels in the second region; and
for the third region, generating a third histogram for a distribution of pixels in the third region.

124. The method of claim 111 wherein the capturing a target image of the finishing pattern from the existing garment of the second material comprises using contrast limited adaptive histogram equalization image processing.

125. The method of claim 111 wherein when using the laser to create a finishing pattern, different laser levels are obtained by varying an output of the laser beam by altering a characteristic of the laser comprising at least one of a frequency, period, pulse width, power, duty cycle, or burning speed.

126. The method of claim 111 wherein the first material comprises a first surface texture characteristic which is different from a second surface texture characteristic of the second material.

127. The method of claim 111 wherein the first material comprises a first dye characteristic which is different from a second dye characteristic of the second material.

128. The method of claim 111 wherein the first material comprises a first base fabric color characteristic which is different from a second base fabric color characteristic of the second material.

129. The method of claim 111 wherein the first material comprises a first yarn characteristic which is different from a second yarn characteristic of the second material.

130. The method of claim 111 wherein the first material comprises a first yarn weight characteristic which is different from a second yarn weight characteristic of the second material.

131. The method of claim 111 wherein the first material comprises a first yarn diameter characteristic which is different from a second yarn diameter characteristic of the second material.

132. The method of claim 111 wherein the first material comprises a first yarn twist characteristic which is different from a second yarn twist characteristic of the second material.

133. A method comprising:
assembling a garment made from fabric panels of a woven first material comprising a warp comprising indigo ring-dyed cotton yarn, wherein the fabric panels are sewn together using thread;
creating a laser input file that is representative of a finishing pattern from an existing garment made from a second material, wherein the first material comprises a different fabric characteristic from the second material, and the creating the laser input file comprises
capturing a target image of the finishing pattern from the existing garment of the second material, and
determining values for the laser input file that will result in a finishing pattern on the first material to obtain an appearance similar to the target image of the finishing pattern from the existing garment of the second material, wherein the determining values for the laser input file comprises
forming a first pattern on a surface of the first material, wherein the first pattern comprises a plurality of color shades, the color shades are lighter shades relative to an original color of the first material, and the first pattern is formed by exposing the first material to a laser beam at a variety of laser levels,
the first pattern comprises a first region comprising a first shade, a second region comprising a second shade, and a third region comprising a third shade, each first, second, and third regions comprise a polygon shape, and
a difference between the first shade and second shade is determined by a first incremental value in a laser input value, a difference between the second shade and third shade is determined by a second incremental value in the laser input value, and the second incremental value is the same as the first incremental value; and
using a laser to create a finishing pattern on an outer surface of the garment based on the laser input file, wherein based on the laser input file, the laser removes selected amounts of material from the surface of the first material at different pixel locations of the garment,
for lighter pixel locations of the finishing pattern, a greater amount of the indigo ring-dyed cotton warp yarn is removed, while for darker pixel locations of the finishing pattern, a lesser amount of the indigo ring-dyed cotton warp yarn is removed, and the finishing pattern created can extend across portions of the garment where two or more fabric panels are joined together by thread by exposing these portions to the laser.

134. The method of claim 133 wherein the finishing pattern on the existing garment was not created by a laser.

135. The method of claim 133 wherein the first material comprises a denim and the second material comprises a denim.

136. The method of claim 133 wherein the garment comprises at least one of a pair of jeans, shirt, short, jacket, vest, or skirt.

137. The method of claim 133 wherein the garment and the existing garment are of the same type of garment.

138. The method of claim 133 wherein the finishing pattern created by the laser on the garment includes a wear pattern comprising at least one of combs or honeycombs, whiskers, stacks, or train tracks, or a combination.

139. The method of claim 133 wherein the first material comprises a weft comprising yarn that has not been indigo dyed.

140. The method of claim 133 wherein for the portions of the garment exposed to the laser where the fabric panels are joined, the fabric panels are joined together using a thread comprising cotton.

141. The method of claim 133 wherein the determining values for the laser input file comprises:
selecting a dark reference in the target image of the finishing pattern from the existing garment of the second material;
for each pixel in the target image, calculating a difference value between a pixel value and the dark reference; and
storing each difference value in the laser input file.

142. The method of claim 133 wherein the using a laser to create a finishing pattern on an outer surface of the garment comprises a single pass of the laser.

143. The method of claim 133 wherein the using a laser to create a finishing pattern on an outer surface of the garment comprises multiple passes of the laser.

144. The method of claim 133 wherein the determining values for the laser input file comprises obtaining a fabric response characteristic for the first material in response to a laser comprising:
for the first region, generating a first histogram for a distribution of pixels in the first region;
for the second region, generating a second histogram for a distribution of pixels in the second region; and
for the third region, generating a third histogram for a distribution of pixels in the third region.

145. The method of claim 133 wherein the capturing a target image of the finishing pattern from the existing garment of the second material comprises using contrast limited adaptive histogram equalization image processing.

146. The method of claim 133 wherein when using the laser to create a finishing pattern, different laser levels are obtained by varying an output of the laser beam by altering a characteristic of the laser comprising at least one of a frequency, period, pulse width, power, duty cycle, or burning speed.

147. The method of claim 133 wherein the first material comprises a first surface texture characteristic which is different from a second surface texture characteristic of the second material.

148. The method of claim 133 wherein the first material comprises a first dye characteristic which is different from a second dye characteristic of the second material.

149. The method of claim 133 wherein the first material comprises a first base fabric color characteristic which is different from a second base fabric color characteristic of the second material.

150. The method of claim 133 wherein the first material comprises a first yarn characteristic which is different from a second yarn characteristic of the second material.

151. The method of claim 133 wherein the first material comprises a first yarn weight characteristic which is different from a second yarn weight characteristic of the second material.

152. The method of claim 133 wherein the first material comprises a first yarn diameter characteristic which is different from a second yarn diameter characteristic of the second material.

153. The method of claim 133 wherein the first material comprises a first yarn twist characteristic which is different from a second yarn twist characteristic of the second material.

154. A method comprising:
providing an assembled garment made from fabric panels of a woven first material comprising a warp comprising indigo ring-dyed cotton yarn, wherein the fabric panels are sewn together using thread;
providing a laser input file that is representative of a finishing pattern from an existing garment made from a second material, wherein the finishing pattern on the existing garment was not created by a laser, and the laser input file was obtained by
capturing a target image of the finishing pattern from the existing garment of the second material, and
determining values for the laser input file that will result in a finishing pattern on the first material to obtain an appearance similar to the target image of the finishing pattern from the existing garment of the second material, wherein the determining values for the laser input file comprises
providing a fabric response characteristic function for the first material in response to a laser, and
converting the target image of the finishing pattern from the existing garment of the second material based on the fabric response characteristic function for the first material into values for the laser input file, and the laser input file comprises a reverse image, compared to the target image; and
using a laser to create a finishing pattern on an outer surface of the assembled garment based on the laser input file, wherein based on the laser input file, the laser removes selected amounts of material from the surface of the first material at different pixel locations of the assembled garment,
for lighter pixel locations of the finishing pattern, a greater amount of the indigo ring-dyed cotton warp yarn is removed, while for darker pixel locations of the finishing pattern, a lesser amount of the indigo ring-dyed cotton warp yarn is removed, and
the finishing pattern created can extend across portions of the assembled garment where two or more fabric panels are joined together by thread by exposing these portions to the laser.

155. The method of claim 154 wherein the first material comprises a denim and the second material comprises a denim.

156. The method of claim 154 wherein the garment comprises at least one of a pair of jeans, shirt, short, jacket, vest, or skirt.

157. The method of claim 154 wherein the garment and the existing garment are of the same type of garment.

158. The method of claim 154 wherein the finishing pattern created by the laser on the garment includes a wear pattern comprising at least one of combs or honeycombs, whiskers, stacks, or train tracks, or a combination.

159. The method of claim 154 wherein the first material comprises a weft comprising yarn that has not been indigo dyed.

160. The method of claim 154 wherein for the portions of the garment exposed to the laser where the fabric panels are joined, the fabric panels are joined together using a thread comprising cotton.

161. The method of claim 154 wherein the determining values for the laser input file comprises:
selecting a dark reference in the target image of the finishing pattern from the existing garment of the second material;
for each pixel in the target image, calculating a difference value between a pixel value and the dark reference; and
storing each difference value in the laser input file.

162. The method of claim 154 wherein the using a laser to create a finishing pattern on an outer surface of the garment comprises a single pass of the laser.

163. The method of claim 154 wherein the using a laser to create a finishing pattern on an outer surface of the garment comprises multiple passes of the laser.

164. The method of claim 154 wherein the determining values for the laser input file comprises:
forming a first pattern on a surface of the first material, wherein the first pattern comprises a plurality of color shades, the color shades are lighter shades relative to an original color of the first material, and the first pattern is formed by exposing the first material to a laser beam at a variety of laser levels,
the first pattern comprises a first region comprising a first shade, a second region comprising a second shade, and a third region comprising a third shade, and
a difference between the first shade and second shade is determined by a first incremental value in a laser input value, a difference between the second shade and third shade is determined by a second incremental value in the laser input value, and the second incremental value is the same as the first incremental value.

165. The method of claim 164 wherein the determining values for the laser input file comprises obtaining a fabric response characteristic for the first material in response to a laser comprising:
for the first region, generating a first histogram for a distribution of pixels in the first region;
for the second region, generating a second histogram for a distribution of pixels in the second region; and
for the third region, generating a third histogram for a distribution of pixels in the third region.

166. The method of claim 154 wherein the capturing a target image of the finishing pattern from the existing garment of the second material comprises using contrast limited adaptive histogram equalization image processing.

167. The method of claim 154 wherein when using the laser to create a finishing pattern, different laser levels are obtained by varying an output of the laser beam by altering a characteristic of the laser comprising at least one of a frequency, period, pulse width, power, duty cycle, or burning speed.

168. The method of claim 154 wherein the first material comprises a first surface texture characteristic which is different from a second surface texture characteristic of the second material.

169. The method of claim 154 wherein the first material comprises a first dye characteristic which is different from a second dye characteristic of the second material.

170. The method of claim 154 wherein the first material comprises a first yarn characteristic which is different from a second yarn characteristic of the second material.

171. The method of claim 154 wherein the first material comprises a first yarn weight characteristic which is different from a second yarn weight characteristic of the second material.

172. The method of claim 154 wherein the first material comprises a first yarn diameter characteristic which is different from a second yarn diameter characteristic of the second material.

173. The method of claim 154 wherein the first material comprises a first yarn twist characteristic which is different from a second yarn twist characteristic of the second material.

174. The method of claim 154 wherein the first material comprises a denim and the second material comprises a denim, the garment and the existing garment comprise jeans, and the finishing pattern created by the laser on the garment includes a wear pattern comprising at least one of combs or honeycombs, whiskers, stacks, or train tracks, or a combination.

175. A method comprising:
providing an assembled garment made from fabric panels of a woven first material comprising a warp comprising indigo ring-dyed cotton yarn, wherein the fabric panels are sewn together using thread;
providing a laser input file that is representative of a finishing pattern from an existing garment made from a second material, wherein the finishing pattern on the existing garment was not created by a laser, and the laser input file was obtained by
capturing a target image of the finishing pattern from the existing garment of the second material, and
determining values for the laser input file that will result in a finishing pattern on the first material to obtain an appearance similar to the target image of the finishing pattern from the existing garment of the second material, wherein the determining values for the laser input file comprises
forming a first pattern on a surface of the first material, wherein the first pattern comprises a plurality of color shades, the color shades are lighter shades relative to an original color of the first material, and the first pattern is formed by exposing the first material to a laser beam at a variety of laser levels,
the first pattern comprises a first region comprising a first shade, a second region comprising a second shade, and a third region comprising a third shade, each first, second, and third regions comprise a polygon shape, and
a difference between the first shade and second shade is determined by a first incremental value in a laser input value, a difference between the second shade and third shade is determined by a second incremental value in the laser input value, and the second incremental value is the same as the first incremental value; and
using a laser to create a finishing pattern on an outer surface of the assembled garment based on the laser input file, wherein based on the laser input file, the laser removes selected amounts of material from the surface of the first material at different pixel locations of the assembled garment,
for lighter pixel locations of the finishing pattern, a greater amount of the indigo ring-dyed cotton warp yarn is removed, while for darker pixel locations of the finishing pattern, a lesser amount of the indigo ring-dyed cotton warp yarn is removed, and
the finishing pattern created can extend across portions of the assembled garment where two or more fabric panels are joined together by thread by exposing these portions to the laser.

176. The method of claim 175 wherein the first material comprises a denim and the second material comprises a denim.

177. The method of claim 175 wherein the garment comprises at least one of a pair of jeans, shirt, short, jacket, vest, or skirt.

178. The method of claim 175 wherein the garment and the existing garment are of the same type of garment.

179. The method of claim 175 wherein the finishing pattern created by the laser on the garment includes a wear pattern comprising at least one of combs or honeycombs, whiskers, stacks, or train tracks, or a combination.

180. The method of claim 175 wherein the first material comprises a weft comprising yarn that has not been indigo dyed.

181. The method of claim 175 wherein for the portions of the garment exposed to the laser where the fabric panels are joined, the fabric panels are joined together using a thread comprising cotton.

182. The method of claim 175 wherein the determining values for the laser input file comprises:
selecting a dark reference in the target image of the finishing pattern from the existing garment of the second material;
for each pixel in the target image, calculating a difference value between a pixel value and the dark reference; and
storing each difference value in the laser input file.

183. The method of claim 175 wherein the using a laser to create a finishing pattern on an outer surface of the garment comprises a single pass of the laser.

184. The method of claim 175 wherein the using a laser to create a finishing pattern on an outer surface of the garment comprises multiple passes of the laser.

185. The method of claim 175 wherein the determining values for the laser input file comprises obtaining a fabric response characteristic for the first material in response to a laser comprising:
for the first region, generating a first histogram for a distribution of pixels in the first region;
for the second region, generating a second histogram for a distribution of pixels in the second region; and
for the third region, generating a third histogram for a distribution of pixels in the third region.

186. The method of claim 175 wherein the capturing a target image of the finishing pattern from the existing garment of the second material comprises using contrast limited adaptive histogram equalization image processing.

187. The method of claim 175 wherein when using the laser to create a finishing pattern, different laser levels are obtained by varying an output of the laser beam by altering a characteristic of the laser comprising at least one of a frequency, period, pulse width, power, duty cycle, or burning speed.

188. The method of claim 175 wherein the first material comprises a first surface texture characteristic which is different from a second surface texture characteristic of the second material.

189. The method of claim 175 wherein the first material comprises a first dye characteristic which is different from a second dye characteristic of the second material.

190. The method of claim 175 wherein the first material comprises a first base fabric color characteristic which is different from a second base fabric color characteristic of the second material.

191. The method of claim 175 wherein the first material comprises a first yarn characteristic which is different from a second yarn characteristic of the second material.

192. The method of claim 175 wherein the first material comprises a first yarn weight characteristic which is different from a second yarn weight characteristic of the second material.

193. The method of claim 175 wherein the first material comprises a first yarn diameter characteristic which is different from a second yarn diameter characteristic of the second material.

194. The method of claim 175 wherein the first material comprises a first yarn twist characteristic which is different from a second yarn twist characteristic of the second material.

195. The method of claim 175 wherein the first material comprises a denim and the second material comprises a denim, the garment and the existing garment comprise jeans, and the finishing pattern created by the laser on the garment includes a wear pattern comprising at least one of combs or honeycombs, whiskers, stacks, or train tracks, or a combination.

196. A method comprising:
assembling a pair of jeans made from fabric panels of a woven first denim material comprising a warp comprising indigo ring-dyed cotton yarn, wherein the fabric panels are sewn together using thread;
creating a laser input file that is representative of a finishing pattern from an existing pair of jeans made from a second denim material, wherein the finishing pattern on the existing jeans was not created by a laser, and the creating the laser input file comprises
capturing a target image of the finishing pattern from the existing jeans of the second denim material, and
determining values for the laser input file that will result in a finishing pattern on the first denim material to obtain an appearance similar to the target image of the finishing pattern from the existing jeans of the second denim material, wherein the determining values for the laser input file comprises
selecting a dark reference in the target image of the finishing pattern from the existing jeans of the second denim material,
for each pixel in the target image, calculating a difference value between a pixel value and the dark reference, and
storing each difference value in the laser input file, wherein the laser input file comprises a reverse image compared to the target image; and
using a laser to create a finishing pattern on an outer surface of the jeans based on the laser input file, wherein based on the laser input file, the laser removes selected amounts of material from the surface of the first material at different pixel locations of the jeans,
for lighter pixel locations of the finishing pattern, a greater amount of the indigo ring-dyed cotton warp yarn is removed, while for darker pixel locations of the finishing pattern, a lesser amount of the indigo ring-dyed cotton warp yarn is removed, and
the finishing pattern created can extend across portions of the jeans where two or more fabric panels are joined together by thread by exposing these portions to the laser.

197. The method of claim 196 wherein the first denim material comprises a weft comprising yarn that has not been indigo dyed.

198. The method of claim 196 wherein for the portions of the jeans exposed to the laser where the fabric panels are joined, the fabric panels are joined together using a thread comprising cotton.

199. The method of claim 196 wherein the using a laser to create a finishing pattern on an outer surface of the jeans comprises a single pass of the laser.

200. The method of claim 196 wherein the using a laser to create a finishing pattern on an outer surface of the jeans comprises multiple passes of the laser.

201. The method of claim 196 wherein the capturing a target image of the finishing pattern from the existing jeans of the second denim material comprises using contrast limited adaptive histogram equalization image processing.

202. The method of claim 196 wherein when using the laser to create a finishing pattern, different laser levels are obtained by varying an output of the laser beam by altering a characteristic of the laser comprising at least one of a frequency, period, pulse width, power, duty cycle, or burning speed.

203. The method of claim 196 wherein the first denim material comprises a first surface texture characteristic which is different from a second surface texture characteristic of the second denim material.

204. The method of claim 196 wherein the first denim material comprises a first dye characteristic which is different from a second dye characteristic of the second denim material.

205. The method of claim 196 wherein the first denim material comprises a first base fabric color characteristic which is different from a second base fabric color characteristic of the second denim material.

206. The method of claim 196 wherein the first denim material comprises a first yarn characteristic which is different from a second yarn characteristic of the second denim material.

207. The method of claim 196 wherein the first denim material comprises a first yarn weight characteristic which is different from a second yarn weight characteristic of the second denim material.

208. The method of claim 196 wherein the first denim material comprises a first yarn diameter characteristic which is different from a second yarn diameter characteristic of the second denim material.

209. The method of claim 196 wherein the first denim material comprises a first yarn twist characteristic which is different from a second yarn twist characteristic of the second denim material.

210. A method comprising:
assembling a pair of jeans made from fabric panels of a woven first denim material comprising a warp comprising indigo ring-dyed cotton yarn, wherein the fabric panels are sewn together using thread;
creating a laser input file that is representative of a finishing pattern from an existing pair of jeans made from a second denim material, wherein the finishing pattern on the existing jeans was not created by a laser, and the creating the laser input file comprises capturing a target image of the finishing pattern from the existing jeans of the second denim material, and determining values for the laser input file that will result in a finishing pattern on the first denim material to obtain an appearance similar to the target image of the finishing pattern from the existing jeans of the second denim material, wherein the determining values for the laser input file comprises providing a fabric response characteristic function for the first denim material in response to a laser, and converting the target image of the finishing pattern from the existing jeans of the second denim material based on the fabric response characteristic function for the first denim material into values for the laser input file, and the laser input file comprises a reverse image, compared to the target image; and using a laser to create a finishing pattern on an outer surface of the jeans based on the laser input file, wherein based on the laser input file, the laser removes selected amounts of material from the surface of the first material at different pixel locations of the jeans, for lighter pixel locations of the finishing pattern, a greater amount of the indigo ring-dyed cotton warp yarn is removed, while for darker pixel locations of the finishing pattern, a lesser amount of the indigo ring-dyed cotton warp yarn is removed, and the finishing pattern created can extend across portions of the jeans where two or more fabric panels are joined together by thread by exposing these portions to the laser.

211. The method of claim 210 wherein the first denim material comprises a weft comprising yarn that has not been indigo dyed.

212. The method of claim 210 wherein for the portions of the jeans exposed to the laser where the fabric panels are joined, the fabric panels are joined together using a thread comprising cotton.

213. The method of claim 210 wherein the determining values for the laser input file comprises:

selecting a dark reference in the target image of the finishing pattern from the existing jeans of the second denim material;

for each pixel in the target image, calculating a difference value between a pixel value and the dark reference; and storing each difference value in the laser input file, wherein the laser input file comprises a reverse image compared to the target image.

214. The method of claim 210 wherein the using a laser to create a finishing pattern on an outer surface of the jeans comprises a single pass of the laser.

215. The method of claim 210 wherein the using a laser to create a finishing pattern on an outer surface of the jeans comprises multiple passes of the laser.

216. The method of claim 210 wherein the determining values for the laser input file comprises:

forming a first pattern on a surface of the first denim material, wherein the first pattern comprises a plurality of color shades, the color shades are lighter shades relative to an original color of the first denim material, and the first pattern is formed by exposing the first denim material to a laser beam at a variety of laser levels, the first pattern comprises a first region comprising a first shade, a second region comprising a second shade, and a third region comprising a third shade, and a difference between the first shade and second shade is determined by a first incremental value in a laser input value, a difference between the second shade and third shade is determined by a second incremental value in the laser input value, and the second incremental value is the same as the first incremental value.

217. The method of claim 216 wherein the determining values for the laser input file comprises obtaining a fabric response characteristic for the first denim material in response to a laser comprising:

for the first region, generating a first histogram for a distribution of pixels in the first region;

for the second region, generating a second histogram for a distribution of pixels in the second region; and for the third region, generating a third histogram for a distribution of pixels in the third region.

218. The method of claim 210 wherein the capturing a target image of the finishing pattern from the existing jeans of the second denim material comprises using contrast limited adaptive histogram equalization image processing.

219. The method of claim 210 wherein when using the laser to create a finishing pattern, different laser levels are obtained by varying an output of the laser beam by altering a characteristic of the laser comprising at least one of a frequency, period, pulse width, power, duty cycle, or burning speed.

220. The method of claim 210 wherein the first denim material comprises a first surface texture characteristic which is different from a second surface texture characteristic of the second denim material.

221. The method of claim 210 wherein the first denim material comprises a first dye characteristic which is different from a second dye characteristic of the second denim material.

222. The method of claim 210 wherein the first denim material comprises a first base fabric color characteristic which is different from a second base fabric color characteristic of the second denim material.

223. The method of claim 210 wherein the first denim material comprises a first yarn characteristic which is different from a second yarn characteristic of the second denim material.

224. The method of claim 210 wherein the first denim material comprises a first yarn weight characteristic which is different from a second yarn weight characteristic of the second denim material.

225. The method of claim 210 wherein the first denim material comprises a first yarn diameter characteristic which is different from a second yarn diameter characteristic of the second denim material.

226. The method of claim 210 wherein the first denim material comprises a first yarn twist characteristic which is different from a second yarn twist characteristic of the second denim material.

227. The method of claim 210 wherein the finishing pattern created by the laser on the jeans includes a wear pattern comprising at least one of combs or honeycombs, whiskers, stacks, or train tracks, or a combination.

228. A method comprising:

assembling a pair of jeans made from fabric panels of a woven first denim material comprising a warp comprising indigo ring-dyed cotton yarn, wherein the fabric panels are sewn together using thread;

creating a laser input file that is representative of a finishing pattern from an existing pair of jeans made from a second denim material, wherein the finishing pattern on the existing jeans was not created by a laser, and the creating the laser input file comprises capturing a target image of the finishing pattern from the existing jeans of the second denim material, and determining values for the laser input file that will result in a finishing pattern on the first denim material to obtain an appearance similar to the target image of the finishing pattern from the existing jeans of the second denim material, wherein the determining values for the laser input file comprises forming a first pattern on a surface of the first denim material, wherein the first pattern comprises a plurality of color shades, the color shades are lighter shades relative to an original color of the first denim material, and the first pattern is formed by exposing the first denim material to a laser beam at a variety of laser levels, the first pattern comprises a first region comprising a first shade, a second region comprising a second shade, and a third region comprising a third shade, each first, second, and third regions comprise the same shape, and a difference between the first shade and second shade is determined by a first incremental value in a laser input value, a difference between the second shade and third shade is determined by a second incremental value in the laser input value, and the second incremental value is the same as the first incremental value; and using a laser to create a finishing pattern on an outer surface of the jeans based on the laser input file, wherein based on the laser input file, the laser removes selected amounts of material from the surface of the first material at different pixel locations of the jeans, for lighter pixel locations of the finishing pattern, a greater amount of the indigo ring-dyed cotton warp yarn is removed, while for darker pixel locations of the finishing pattern, a lesser amount of the indigo ring-dyed cotton warp yarn is removed, and the finishing pattern created can extend across portions of the jeans where two or more fabric panels are joined together by thread by exposing these portions to the laser.

229. The method of claim 228 wherein the determining values for the laser input file comprises obtaining a fabric response characteristic for the first denim material in response to a laser comprising:

for the first region, generating a first histogram for a distribution of pixels in the first region;

for the second region, generating a second histogram for a distribution of pixels in the second region; and for the third region, generating a third histogram for a distribution of pixels in the third region.

230. The method of claim 228 wherein the first denim material comprises a weft comprising yarn that has not been indigo dyed.

231. The method of claim 228 wherein for the portions of the jeans exposed to the laser where the fabric panels are joined, the fabric panels are joined together using a thread comprising cotton.

232. The method of claim 228 wherein the determining values for the laser input file comprises:

selecting a dark reference in the target image of the finishing pattern from the existing jeans of the second denim material;

for each pixel in the target image, calculating a difference value between a pixel value and the dark reference; and storing each difference value in the laser input file, wherein the laser input file comprises a reverse image compared to the target image.

233. The method of claim 228 wherein the using a laser to create a finishing pattern on an outer surface of the jeans comprises a single pass of the laser.

234. The method of claim 228 wherein the using a laser to create a finishing pattern on an outer surface of the jeans comprises multiple passes of the laser.

235. The method of claim 228 wherein the capturing a target image of the finishing pattern from the existing jeans of the second denim material comprises using contrast limited adaptive histogram equalization image processing.

236. The method of claim 228 wherein when using the laser to create a finishing pattern, different laser levels are obtained by varying an output of the laser beam by altering a characteristic of the laser comprising at least one of a frequency, period, pulse width, power, duty cycle, or burning speed.

237. The method of claim 228 wherein the first denim material comprises a first surface texture characteristic which is different from a second surface texture characteristic of the second denim material.

238. The method of claim 228 wherein the first denim material comprises a first dye characteristic which is different from a second dye characteristic of the second denim material.

239. The method of claim 228 wherein the first denim material comprises a first base fabric color characteristic which is different from a second base fabric color characteristic of the second denim material.

240. The method of claim 228 wherein the first denim material comprises a first yarn characteristic which is different from a second yarn characteristic of the second denim material.

241. The method of claim 228 wherein the first denim material comprises a first yarn weight characteristic which is different from a second yarn weight characteristic of the second denim material.

242. The method of claim 228 wherein the first denim material comprises a first yarn diameter characteristic which is different from a second yarn diameter characteristic of the second denim material.

243. The method of claim 228 wherein the first denim material comprises a first yarn twist characteristic which is different from a second yarn twist characteristic of the second denim material.

244. The method of claim 228 wherein the finishing pattern created by the laser on the jeans includes a wear pattern comprising at least one of combs or honeycombs, whiskers, stacks, or train tracks, or a combination.

* * * * *